(12) United States Patent
Nemet et al.

(10) Patent No.: US 8,540,156 B2
(45) Date of Patent: Sep. 24, 2013

(54) SYSTEM AND METHOD FOR QUALITY MANAGEMENT UTILIZING BARCODE INDICATORS

(75) Inventors: Yaron Nemet, Kedumim (IL); Ephraim Brand, Givatayim (IL)

(73) Assignee: Varcode Ltd., Rosh Ha'ayin (IL)

( * ) Notice: Subject to any disclaimer, the term of this patent is extended or adjusted under 35 U.S.C. 154(b) by 475 days.

(21) Appl. No.: 12/742,650

(22) PCT Filed: Nov. 13, 2008

(86) PCT No.: PCT/IL2008/001494
§ 371 (c)(1),
(2), (4) Date: Sep. 30, 2010

(87) PCT Pub. No.: WO2009/063464
PCT Pub. Date: May 22, 2009

(65) Prior Publication Data
US 2011/0006115 A1     Jan. 13, 2011

Related U.S. Application Data

(60) Provisional application No. 61/131,644, filed on Jun. 10, 2008.

(30) Foreign Application Priority Data

Nov. 14, 2007   (WO) .................. PCT/IL2007/001411

(51) Int. Cl.
*G06K 5/00*     (2006.01)
(52) U.S. Cl.
USPC ..................... 235/437; 235/462.01
(58) Field of Classification Search
USPC .......................... 235/437, 494, 462.1, 472.01
See application file for complete search history.

(56) References Cited

U.S. PATENT DOCUMENTS

| 4,057,029 A | 11/1977 | Seiter |
| 4,059,407 A | 11/1977 | Hochstrasser |

(Continued)

FOREIGN PATENT DOCUMENTS

| EP | 936753 A2 | 8/1999 |
| JP | 353281 A | 3/1991 |

(Continued)

OTHER PUBLICATIONS

A Supplementary European Search Report dated Apr. 13, 2011, which issued during the prosecution of Applicant's European Patent Application No. EP07827384.

(Continued)

*Primary Examiner* — Thien M Le
(74) *Attorney, Agent, or Firm* — Fish & Richardson P.C.

(57) ABSTRACT

A barcoded quality indicator operative to provide a machine-readable indication of exceedance of at least one product quality threshold by at least one product quality affecting parameter, the barcoded quality indicator including a changeable barcode including at least one material having at least one variable visually-sensible characteristic which gradually changes as a function of changes in the at least one product quality affecting parameter and a background having at least one selectable visually-sensible characteristic which is not variable or not variable in the same way as is the barcode. The machine-readable indication of exceedance being represented by a machine-readable difference between the at least one variable visually-sensible characteristic and the at least one selectable visually-sensible characteristic, the barcoded quality indicator providing a first machine-readable indication prior to the exceedance of the at least one threshold and a second machine-readable indication, different from the first machine-readable indication.

12 Claims, 13 Drawing Sheets

(56) References Cited

U.S. PATENT DOCUMENTS

| | | | |
|---|---|---|---|
| 5,053,339 A | 10/1991 | Patel | |
| 5,085,802 A | 2/1992 | Jalinski | |
| 5,254,473 A | 10/1993 | Patel | |
| 5,591,952 A | 1/1997 | Krichever | |
| 5,600,119 A | 2/1997 | Dvorkis | |
| 5,634,195 A | 5/1997 | Sawyer | |
| 5,902,982 A | 5/1999 | Lappe | |
| 6,009,400 A * | 12/1999 | Blackman | 705/303 |
| 6,036,092 A | 3/2000 | Lappe | |
| 6,190,610 B1 | 2/2001 | Goldsmith et al. | |
| 6,479,016 B1 | 11/2002 | Goldsmith et al. | |
| 6,495,368 B1 | 12/2002 | Wallach | |
| 6,544,925 B1 | 4/2003 | Prusik et al. | |
| 6,685,094 B2 * | 2/2004 | Cameron | 235/468 |
| 6,758,397 B2 | 7/2004 | Catan | |
| 6,982,640 B2 * | 1/2006 | Lindsay et al. | 340/540 |
| 7,017,806 B2 | 3/2006 | Peterson | |
| 7,053,777 B2 | 5/2006 | Allen | |
| 7,057,495 B2 | 6/2006 | Debord et al. | |
| RE39,226 E | 8/2006 | Lappe | |
| 7,156,597 B2 | 1/2007 | Goldsmith et al. | |
| 7,157,048 B2 | 1/2007 | Goldsmith et al. | |
| 7,262,792 B2 * | 8/2007 | Shniberg et al. | 348/169 |
| 7,562,811 B2 * | 7/2009 | Nemet et al. | 235/375 |
| 8,091,776 B2 * | 1/2012 | Nemet et al. | 235/376 |
| 2002/0056756 A1 | 5/2002 | Cameron et al. | |
| 2003/0227392 A1 | 12/2003 | Ebert et al. | |
| 2004/0018641 A1 | 1/2004 | Goldsmith et al. | |
| 2004/0215514 A1 | 10/2004 | Quinlan et al. | |
| 2005/0162274 A1 | 7/2005 | Shniberg et al. | |
| 2006/0032427 A1 | 2/2006 | Ishii et al. | |
| 2006/0057022 A1 * | 3/2006 | Williams et al. | 422/56 |
| 2006/0260958 A1 | 11/2006 | Brunner | |
| 2007/0067177 A1 * | 3/2007 | Martin et al. | 705/1 |
| 2008/0173712 A1 * | 7/2008 | Nemet et al. | 235/385 |
| 2009/0230182 A1 | 9/2009 | Nemet et al. | |
| 2009/0302102 A1 | 12/2009 | Nemet et al. | |
| 2010/0020970 A1 | 1/2010 | Liu et al. | |
| 2010/0219235 A1 | 9/2010 | Nemet et al. | |

FOREIGN PATENT DOCUMENTS

| | | | |
|---|---|---|---|
| JP | 56470 A | 1/1993 | |
| JP | 567253 A | 3/1993 | |
| JP | 9504858 A | 5/1997 | |
| JP | 200240012 A | 2/2002 | |
| JP | 2002504684 A | 2/2002 | |
| JP | 2003525464 A | 8/2003 | |
| JP | 2004184920 A | 7/2004 | |
| JP | 2006522933 A | 10/2006 | |
| WO | WO9427144 A1 | 11/1994 | |
| WO | WO9711535 A1 | 3/1997 | |
| WO | WO9835514 A3 | 12/1998 | |
| WO | WO9942822 A1 | 8/1999 | |
| WO | WO0164430 A1 | 9/2001 | |
| WO | WO2004092697 A1 | 10/2004 | |
| WO | WO2007129316 A3 | 4/2009 | |
| WO | WO2008135962 A3 | 4/2009 | |
| WO | WO2009063464 A2 | 5/2009 | |
| WO | WO2009063465 A2 | 5/2009 | |
| WO | WO2009150641 A1 | 12/2009 | |
| WO | WO2010134061 A1 | 11/2010 | |

OTHER PUBLICATIONS

A Supplementary European Search Report dated Aug. 23, 2012, which issued during the prosecution of Applicant's European Application No. 08849330.9.

An Office Action dated Mar. 9, 2012, which issued during the prosecution of U.S. Appl. No. 12/743,209.

An English translation of an Office Action dated Feb. 7, 2012, which issued during the prosecution of JP Patent Application No. 2009-508663.

An Office Action dated Apr. 25, 2012, which issued during the prosecution of U.S. Appl. No. 12/598,979.

An International Search Report dated Jun. 8, 2010 which issued during the prosecution of Applicant's PCT/IL10/00205.

An International Preliminary Report on Patentability dated May 18, 2010 which issued during the prosecution of Applicant's PCT/IL08/001495.

An International Search Report dated Mar. 9, 2009 which issued during the prosecution of Applicant's PCT/IL08/001495.

An International Preliminary Report on Patentability dated May 18, 2010 which issued during the prosecution of Applicant's PCT/IL08/001494.

An International Search Report dated Jun. 3, 2009 which issued during the prosecution of Applicant's PCT/IL08/001494.

An Office Action dated Mar. 15, 2013, which issued during the prosecution of U.S. Appl. No. 13/321,467.

An Office Action dated Mar. 20, 2013, which issued during the prosecution of U.S. Appl. No. 13/321,477.

An English Translation of an Office Action dated Feb. 21, 2013 which issued during the prosecution of Japanese Patent Application No. JP2009-508663.

An English Translation of an Office Action dated Jan. 15, 2013 which issued during the prosecution of Japanese Patent Application No. JP2010-507054.

An Extended European Search Report dated Feb. 11, 2013, which issued during the prosecution of European Application No. 08848845.

An Extended European Search Report dated Feb. 18, 2013, which issued during the prosecution of European Application No. 09762166.

An Office Action together with the English translation dated Oct. 25, 20112, which issued during the prosecution of Israel Patent Application No. 201958.

A Notice of Allowance dated Apr. 26, 2013, which issued during the prosecution of U.S. Appl. No. 12/598,979.

* cited by examiner

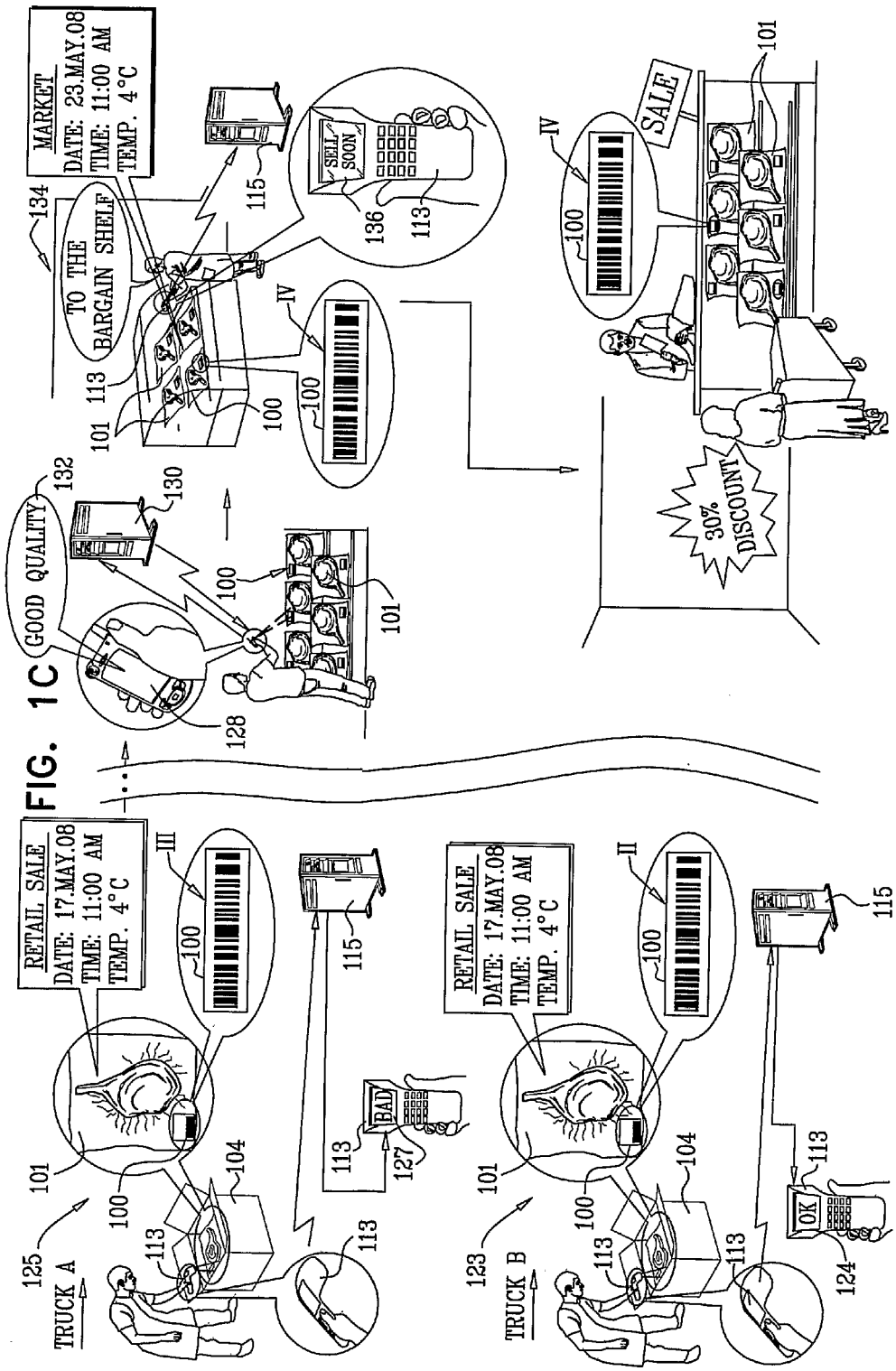

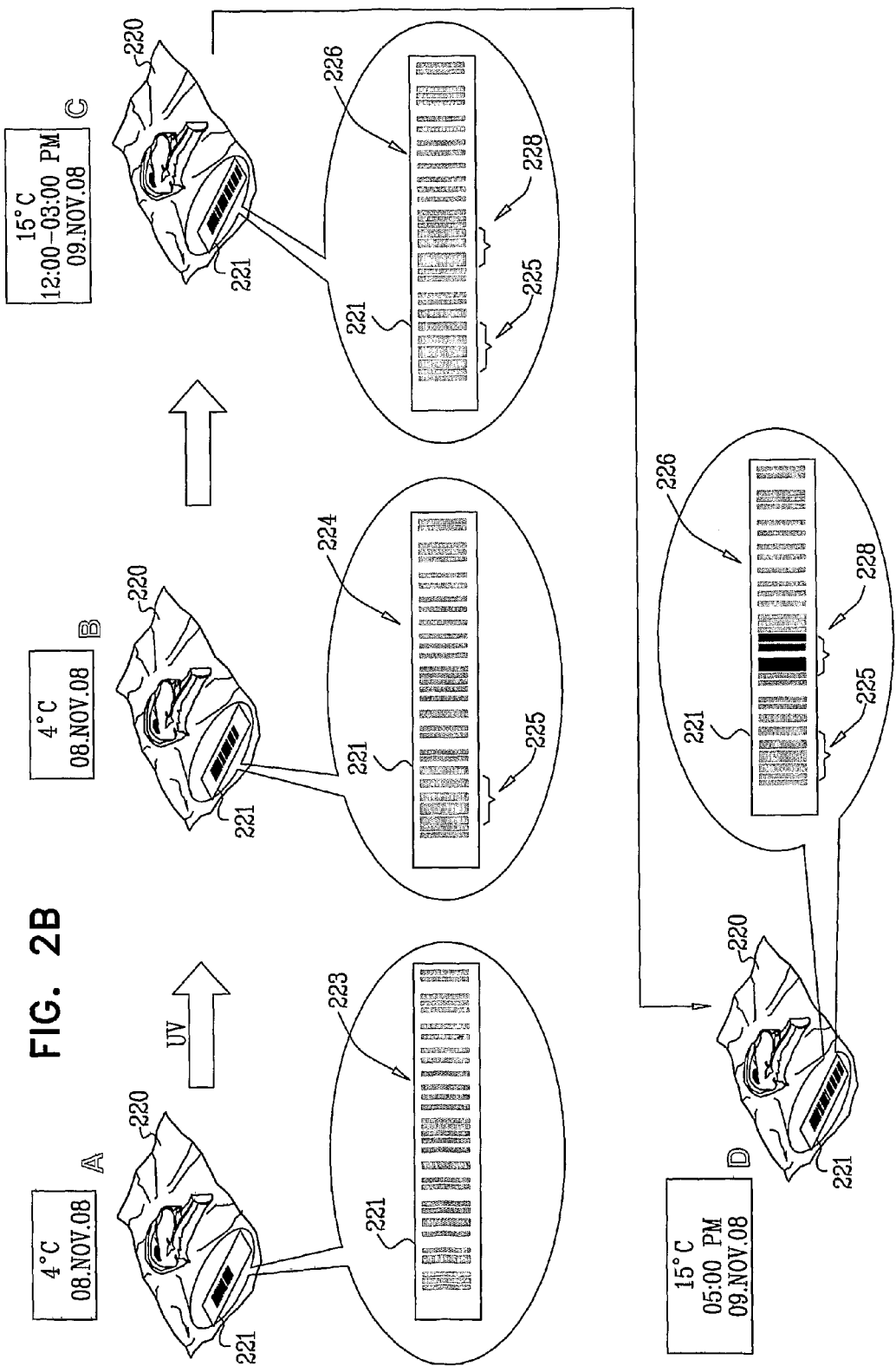

ABSORBED CUMULATIVE ENERGY
CORRESPONDING TO TIME AND TEMPERATURE

ABSORBED CUMULATIVE ENERGY
CORRESPONDING TO TIME AND TEMPERATURE

SYSTEM AND METHOD FOR QUALITY MANAGEMENT UTILIZING BARCODE INDICATORS

CROSS REFERENCE TO PRIOR APPLICATIONS

This is a U.S. National Phase application under 35 U.S.C. §371 of International Patent Application No. PCT/IL2008/001494, filed Nov. 13, 2008, and claims the priority of International Patent Application No. PCT/IL2007/001411, filed Nov. 14, 2007 and U.S. Provisional Patent Application No. 61/131,644, filed Jun. 10, 2008, all of which are incorporated by reference herein. The International Application published in English on May 22, 2009 as WO 2009/063464 under PCT Article 21(2).

REFERENCE TO RELATED APPLICATIONS

Reference is made to PCT Patent Application No. PCT/IL07/000,547, filed May 6, 2007 and entitled "A System And Method For Improved Quality Management In A Product Logistic Chain", to PCT Patent Application No. PCT/IL07/01411, filed Nov. 14, 2007 and entitled "A System And Method For Quality Management Utilizing Barcode Indicators", and to U.S. Provisional Application No. 61/131,644, filed Jun. 10, 2008 and entitled "A System And Method For Quality Management Utilizing Barcode Indicators", the disclosures of which are hereby incorporated by reference.

Priority is hereby claimed under 37 CFR 1.78(a) (1) and (2)(i) from PCT Patent Application No. PCT/IL07/01411, filed Nov. 14, 2007 and entitled "A System And Method For Quality Management Utilizing Barcode Indicators", and under 37 CFR 1.78(a) (4) and (5)(i) from U.S. Provisional Application No. 61/131,644, filed Jun. 10, 2008 and entitled "A System And Method For Quality Management Utilizing Barcode Indicators".

FIELD OF THE INVENTION

The present invention relates to quality management systems and methodologies and to indicators useful in such systems and methodologies.

BACKGROUND OF THE INVENTION

The following U.S. Patents relate generally to the subject matter of the present application: U.S. Pat. Nos. 6,758,397; 6,009,400, 6,685,094, 5,805,245 and RE 39,226.

Additional information relating to time-temperature indicators is available on the internet at www.onvu.com.

SUMMARY OF THE INVENTION

The present invention seeks to provide improved quality management systems and methodologies as well as indicators useful in such systems and methodologies.

There is thus provided in accordance with a preferred embodiment of the present invention a barcoded quality indicator operative to provide a machine-readable indication of exceedance of at least one product quality threshold by at least one product quality affecting parameter, the barcoded quality indicator including a changeable barcode including at least one material having at least one variable visually-sensible characteristic which gradually changes as a function of changes in the at least one product quality affecting parameter and a background having at least one selectable visually-sensible characteristic which is not variable or not variable in the same way as is the barcode, the machine-readable indication of exceedance being represented by a machine-readable difference between the at least one variable visually-sensible characteristic and the at least one selectable visually-sensible characteristic, the barcoded quality indicator providing a first machine-readable indication prior to the exceedance of the at least one threshold and a second machine-readable indication, different from the first machine-readable indication, following the exceedance of the at least one threshold.

Preferably, the barcoded quality indicator includes a linear barcode.

Preferably, the first and the second machine-readable indications have identical checksum digits and differ by two digits thereof, and the first and the second machine-readable indications have checksum integrity under an EAN/UPC checksum system. Alternatively, the first and the second machine-readable indications have different checksum digits and differ by at least one digit thereof and the first and the second machine-readable indications have checksum integrity under an EAN/UPC checksum system.

Preferably, at least one of the product quality affecting parameters is time.

Additionally or alternatively, at least one of the product quality affecting parameters is temperature. Additionally, the product quality affecting parameters are time and temperature.

Preferably, at least one of the product quality affecting parameters is humidity.

Preferably, at least one of the product quality affecting parameters is pH.

Preferably, the barcoded quality indicator is operative to provide indications of exceedance of several different thresholds and wherein an indication of exceedance may be provided for one threshold at a time when an indication of exceedance is not provided for another threshold.

Preferably, the barcoded quality indicator is operative to provide the machine-readable indication only following actuation thereof. Additionally, prior to the actuation the barcoded quality indicator is in a first visible state and following the actuation the barcoded quality indicator is in a second visible state, different from the first visible state, and wherein the barcoded quality indicator is machine-readable at least in the second visible state. Additionally, the barcoded quality indicator is not machine-readable when the indicator is in the first visible state. Alternatively, the barcoded quality indicator is machine-readable when the indicator is in the first visible state.

Preferably, the barcoded quality indicator is machine-readable at all times, after first becoming readable, including times prior to, during and immediately following exceedance of the at least one threshold by the at least one product quality affecting parameter.

Preferably, the machine-readable difference between the at least one selectable visually-sensible characteristic and the at least one variable visually-sensible characteristic corresponds to a specific operational range of the at least one product quality affecting parameter.

Preferably, the changeable barcode includes at least a plurality of bars printed with at least one material having a variable visually-sensible characteristic which changes in response to a change in a product quality affecting parameter.

Preferably, the changeable barcode includes at least a plurality of bars printed with at least one material having a visually-sensible characteristic which does not change in response to a change in a product quality affecting parameter.

Preferably, the visually-sensible characteristics are selected from black, white and shades of gray.

Preferably, the at least one material having at least one variable visually-sensible characteristic is a thermochromic material.

There is also provided in accordance with another preferred embodiment of the present invention a quality management system for products including a multiplicity of barcoded quality indicators operative to provide a machine-readable indication of exceedance of at least one product quality threshold by at least one product quality affecting parameter, the barcoded quality indicators including a changeable barcode including at least one material having at least one variable visually-sensible characteristic which gradually changes as a function of changes in the at least one product quality affecting parameter and a background having at least one selectable visually-sensible characteristic which is not variable or not variable in the same way as is the barcode, the machine-readable indication of exceedance being represented by a machine-readable difference between the at least one selectable visually-sensible characteristic and the at least one variable visually-sensible characteristic, the barcoded quality indicators providing a first machine-readable indication prior to the exceedance of the at least one threshold and a second machine-readable indication, different from the first machine-readable indication, following the exceedance of the at least one threshold, a barcode indicator reader operative to read the barcoded quality indicators and to provide output indications based on a difference between the at least one selectable visually-sensible characteristic of the background and the at least one variable visually-sensible characteristic of the barcode, and an indication interpreter operative to receive the output indications and to provide human sensible product quality status outputs.

Preferably, the barcoded quality indicators include linear barcodes.

Preferably, the first and the second machine-readable indications have identical checksum digits and differ by two digits thereof, and wherein the first and the second machine-readable indications have checksum integrity under an EAN/UPC checksum system. Alternatively, the first and the second machine-readable indications have different checksum digits and differ by at least one digit thereof and wherein the first and the second machine-readable indications have checksum integrity under an EAN/UPC checksum system.

Preferably, the indication interpreter is further operative to receive an input in addition to the output indications, the input being necessary to provide product quality status outputs. Additionally, the indication interpreter forms part of or is otherwise connected to a computer including a product status table useful to provide product quality status outputs based on the output indications and the input. Additionally or alternatively, the input includes product-related parameters. Additionally or alternatively, the input includes parameters related to the indicator.

There is additionally provided in accordance with yet another preferred embodiment of the present invention a quality management system for products including a first multiplicity of individual package specific barcoded quality indicators of the invention, a second multiplicity of outer package specific barcoded quality indicators of the invention, an indicator reader operative to read the indicators and to provide output indications, and a product type responsive indication interpreter operative to receive the output indications and to provide human sensible product quality status outputs.

Preferably, the outer package specific indicators indicate the exceedance of thresholds which correspond to the thresholds for which indication of exceedance is provided by the individual package specific indicators. Additionally, indication of exceedance may be provided by the outer package specific indicators associated with outer packages even when indication of exceedance is not provided by the individual package specific indicators attached to the individual packages contained therein. Additionally, indication of exceedance is not provided by the individual package specific indicators associated with individual packages if an indication of exceedance was not provided by the outer package specific indicators associated with the outer packages containing them.

Preferably, the thresholds for which indication of exceedance is provided by the outer package specific indicators correspond to an operative range different from the operative range to which the thresholds for which indication of exceedance is provided by the individual package specific indicators correspond.

There is also provided in accordance with yet another preferred embodiment of the present invention a method of producing a multiplicity of quality indicators including a changeable barcode, the quality indicators being operative to provide a machine-readable indication of exceedance of at least one product quality threshold by at least one product quality affecting parameter, the method including printing a background using a first material having at least one selectable visually-sensible characteristic which is invariable with respect to the at least one product quality affecting parameter, and printing a changeable barcode using a second material having at least one variable visually-sensible characteristic which gradually changes as a function of changes in the at least one product quality affecting parameter, the machine-readable indication of exceedance of the at least one product quality threshold being represented by a machine-readable difference between the at least one selectable visually-sensible characteristic and the at least one variable visually-sensible characteristic.

Preferably the method of producing a multiplicity of quality indicators also includes receiving non indicator-specific inputs including characteristics of a first plurality of materials each having at least one selectable visually-sensible characteristic which is invariable with respect to a plurality of product quality affecting parameters, receiving non indicator-specific inputs including characteristics of a second plurality of materials each having at least one variable visually-sensible characteristic which gradually changes as a function of changes in the plurality of product quality affecting parameters, receiving an indicator-specific input including a set of thresholds of product quality affecting parameters whose exceedance is to be indicated by the multiplicity of barcoded quality indicators, and selecting the first material based on the characteristics thereof for printing the background and the second material based on the characteristics thereof for printing the changeable barcode in order to provide the machine-readable indication of exceedance of the at least one product quality threshold by the at least one product quality affecting parameter.

Preferably, the method also includes overprinting multiple different materials on at least part of the changeable barcode.

Preferably, the plurality of materials having variable visually-sensible characteristics is a plurality of thermochromic materials.

Preferably, the visually-sensible characteristics are selected from black, white and shades of gray.

There is additionally provided in accordance with another preferred embodiment of the present invention a method of providing quality management for products including producing a multiplicity of barcoded quality indicators operative to provide a machine-readable indication of exceedance of at least one product quality threshold by at least one product quality affecting parameter, the barcoded quality indicators including a changeable barcode including at least one material having at least one variable visually-sensible characteristic which gradually changes as a function of changes in the at least one product quality affecting parameter and a background having at least one selectable visually-sensible characteristic which is not variable or not variable in the same way as is the barcode, the machine-readable indication of exceedance being represented by a machine-readable difference between the at least one selectable visually-sensible characteristic and the at least one variable visually-sensible characteristic, the barcoded quality indicators providing a first machine-readable indication prior to the exceedance of the at least one threshold and a second machine-readable indication, different from the first machine-readable indication, following the exceedance of the at least one threshold, employing a barcode indicator reader to read the barcoded quality indicators and to provide output indications based on a difference between the at least one selectable visually-sensible characteristic of the background and the at least one variable visually-sensible characteristic of the barcode, and interpreting the output indications to provide human sensible, product unit specific, product quality status outputs.

Preferably, the barcoded quality indicators include a linear barcode.

Preferably, the first and the second machine-readable indications have identical checksum digits and differ by two digits thereof, and wherein the first and the second machine-readable indications have checksum integrity under an EAN/UPC checksum system. Alternatively, the first and the second machine-readable indications have different checksum digits and differ by at least one digit thereof and wherein the first and the second machine-readable indications have checksum integrity under an EAN/UPC checksum system.

BRIEF DESCRIPTION OF THE DRAWINGS

The present invention will be understood and appreciated more fully from the following detailed description, taken in conjunction with the drawings in which:

FIGS. 1A-1F together are a simplified illustration of a system and methodology for quality management constructed and operative in accordance with a preferred embodiment of the present invention;

FIGS. 2A and 2B are simplified illustrations of a quality indicator constructed and operative in accordance with a preferred embodiment of the present invention for indicating combined time and temperature history within a first operational range;

DETAILED DESCRIPTION OF PREFERRED EMBODIMENTS

Figure 1A:
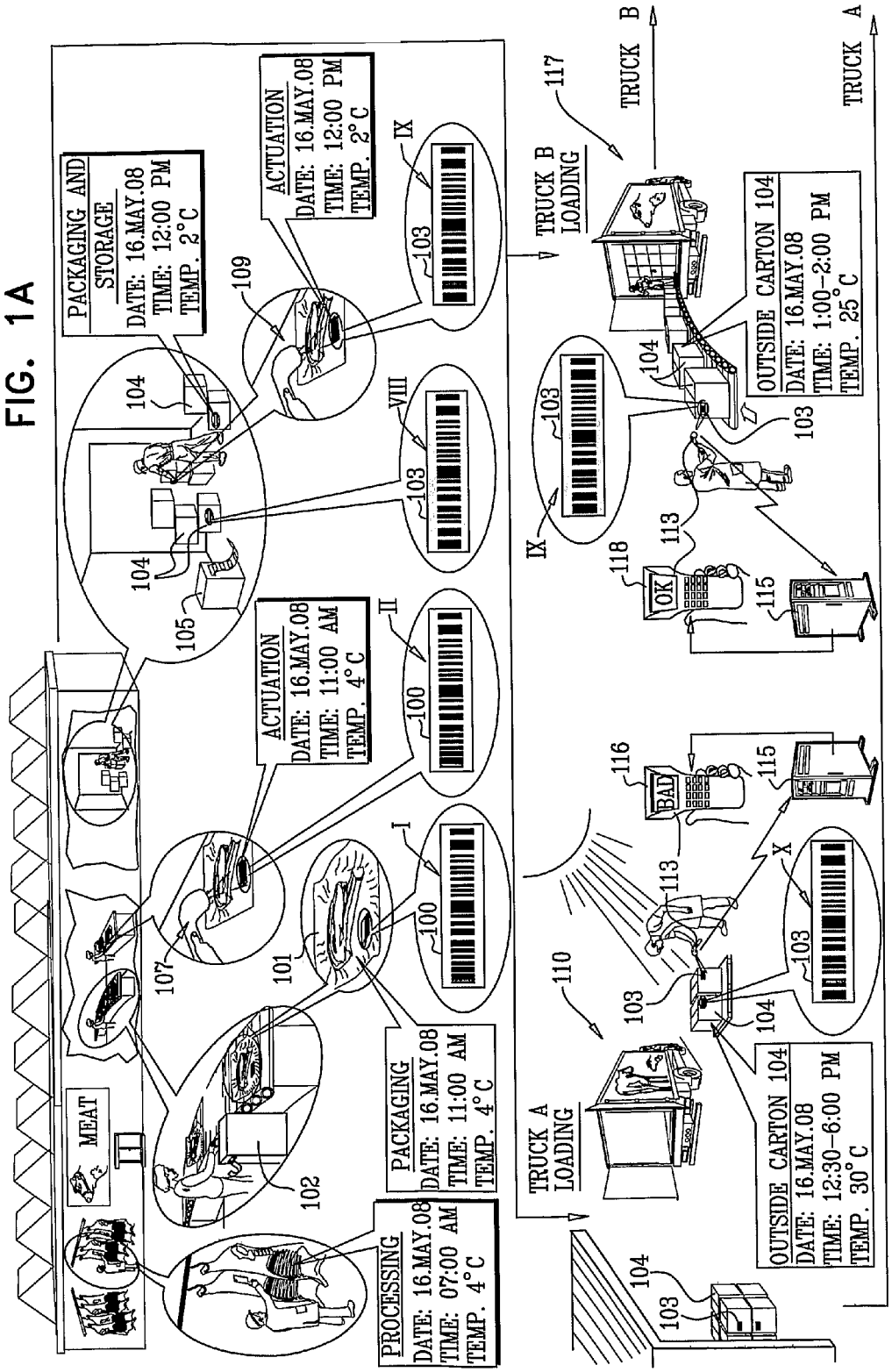

Reference is now made to FIGS. 1A-1F which together are a simplified illustration of a system and methodology for quality management constructed and operative in accordance with a preferred embodiment of the present invention. As seen in FIGS. 1A-1F, there is provided a quality management system and methodology for products including a multiplicity of barcoded quality indicators, each indicator including a changeable barcode and a background having at least one selectable visually-sensible characteristic which is not variable in the same way as is the barcode, and each indicator is operative to provide a machine-readable, preferably barcode-reader-readable, indication of exceedance of at least one threshold by at least one product quality affecting parameter. The quality management system and methodology preferably further includes at least one indicator reader operative to read the quality indicators and to provide output indications, and a product type responsive indication interpreter operative to receive the output indications and to provide human sensible, product quality status outputs.

The term "barcode" is used herein to refer to a machine readable optical code. In the examples in the specification, linear, or one-dimensional bar codes are illustrated. It is appreciated that the invention may be applicable to two dimensional bar codes as well.

Preferably, as elaborated hereinbelow with reference to FIG. 6, in addition to receiving the output indications provided by the indicator reader the indication interpreter may also receive product-related parameters such as product type, for example "meat", and product manufacturing date. Additionally or alternatively, the indication interpreter may receive other parameters, for example information relating to the quality indicator, such as the range of parameters sensed by the quality indicator, when the quality indicator was actuated, and the visually-sensible characteristic of the background. Additionally or alternatively, the indication interpreter may also received parameters relating to the source of the output indications provided, for example, whether the output indications were provided by a hand held device during inspection, or by the checkout scanner of a retail store.

The product-related parameters and the other parameters, such as those relating to the quality indicator, may be provided by the quality indicator itself or by an additional, separate indicator, such as a barcode-bearing indicator. As a further alternative, these parameters may be provided by sensors, a priori information otherwise available to the indication interpreter or by manual entry.

The indication interpreter preferably forms part of or is otherwise connected to a quality indication computer, which may be remote from the indicator reader and which preferably includes a product status table providing product quality status outputs based on the output indications provided by the indicator reader and the additional parameters.

It is appreciated that the additional parameters may be provided via another part of the same barcode or by another barcode associated with the same product. Alternatively, the additional parameters may be provided by other methods, such as using RFID technology.

The quality indicator may incorporate a product code such as an EAN (European Article Number) or a UPC code (Universal Product Code). The examples shown in the description which follows all illustrate the use of an EAN code. Alternatively, the quality indicator may incorporate a 2 of 5 interleaved barcode or any other suitable barcode or machine-readable methodology.

In accordance with a preferred embodiment of the present invention each of the multiplicity of barcoded quality indicators includes a changeable barcode including at least one selectably appearing barcode portion printed using at least one material having at least one variable visually-sensible characteristic and a background printed using at least one material having at least one selectable visually-sensible characteristic which is not variable in the same way as is the barcode. Preferably the variable visually-sensible characteristic has at least a first state and a second state and it changes from the first state to the second state in response to a change in a product quality affecting parameter.

It is appreciated, as explained hereinbelow with reference to FIG. 4, that the changing from the first state to the second state is gradual and not abrupt. It is further appreciated that between one extreme state of the variable visually-sensible characteristic, for example when it is transparent, and the other extreme state of the variable visually-sensible characteristic, for example when it is black, there are intermediate states, for example shades of gray. Preferably, any of the states of the variable visually-sensible characteristics in the selectably appearing portion of the changeable barcode may be made machine-readable by selecting a suitable visually-sensible characteristic for the background.

It is further appreciated that different states of materials having the same variable visually-sensible characteristic and printed in separate selectably appearing portions of the same barcode may be made machine-readable by selecting different visually-sensible characteristics for the backgrounds surrounding each of the separate selectably appearing portions of the barcode. Accordingly, each the separate selectably appearing portions of the barcode may provide indication of exceedance of a different threshold.

The at least one selectably appearing barcode portion preferably includes at least one plurality of bars. Additionally, the changeable barcode of the indicator may include a fixed barcode portion including a plurality of bars printed using at least one material having at least one selectable visually-sensible characteristic which is not variable in the same way as is the barcode.

It is appreciated that instead of or in addition to a selectably appearing portion the barcoded quality indicator may include a selectable disappearing portion.

It is also appreciated that the selectable visually-sensible characteristic of the background is not variable in the same way as is the visually-sensible characteristic in the selectably appearing or selectably disappearing portion of the changeable barcode, however, the visually-sensible characteristic of the background may be variable in a different way. It is further appreciated that the background may be printed using a thermochromic material having a visually-sensible characteristic which changes in response to a change in a product quality affecting parameter. It is also appreciated that if the background is printed using a thermochromic material having a visually-sensible characteristic which changes in response to a change in a product quality affecting parameter then the barcode may be printed with a material having a visually-sensible characteristic which does not change in response to the same product quality affecting parameter. The illustrations in this application describe embodiments wherein the barcode changes in response to a change in a product quality affecting parameter and the background does not change in response to a change in a product quality affecting parameter.

Preferably, the changeable barcode has barcode checksum integrity when read by a conventional barcode reader. Accordingly, it is appreciated that the at least one selectably appearing barcode portion includes at least two digits which are different from those encoded by the corresponding bars in the fixed barcode portion, and the checksum is not necessarily changed as a result of a change in the at least one selectably appearing barcode portion. The checksum digit may be part of the fixed barcode portion or of the at least one selectably appearing barcode portion.

It is appreciated that in order to maintain checksum integrity under an EAN/UPC checksum system a barcode can be changed into another barcode by replacing at least two digits thereof, one of which may be the checksum digit. Each pair of digits can be replaced by another pair of digits where MOD10 of the weighted sum of both pairs is the same. For example, two adjacent digits in an EAN barcode, A1 in an even position and A2 in an odd position, may be replaced by two digits B1 and B2 such that MOD10 (3×A1+A2)=MOD10(3XB1+B2). If, for example, the pair (A1, A2) is (4,3) then (B1, B2) may be (8, 1), because MOD10 of the weighted sum in both cases is 5. In the embodiments illustrated in FIGS. 1, 2, 3 and 6 of this application a digit is replaced by another digit only by printing additional bar widths. Accordingly, the possible replacements which can be made by adding bar widths are provided in Table I.

TABLE I

| Digit in barcode before change | Possible replacements according to location of digit | | |
|---|---|---|---|
| | Left hand encoding | | Right hand encoding |
| | Odd parity | Even parity | All characters |
| 0 | 3, 6 | none | none |
| 1 | 3, 7 | none | none |
| 2 | 7, 8 | none | none |
| 3 | none | 0, 1, 5 | 0, 1, 5 |
| 4 | 6, 7, 8 | none | none |
| 5 | 3, 7, 8 | none | none |
| 6 | none | 0, 4, 9 | 0, 4, 9 |
| 7 | none | 1, 2, 4, 5, 9 | 1, 2, 4, 5, 9 |
| 8 | none | 2, 4, 5 | 2, 4, 5 |
| 9 | 6, 7 | none | none |

It is appreciated that the odd parity or the even parity of a digit is defined in accordance with the EAN (European Article Number) standard.

Figure 4A:
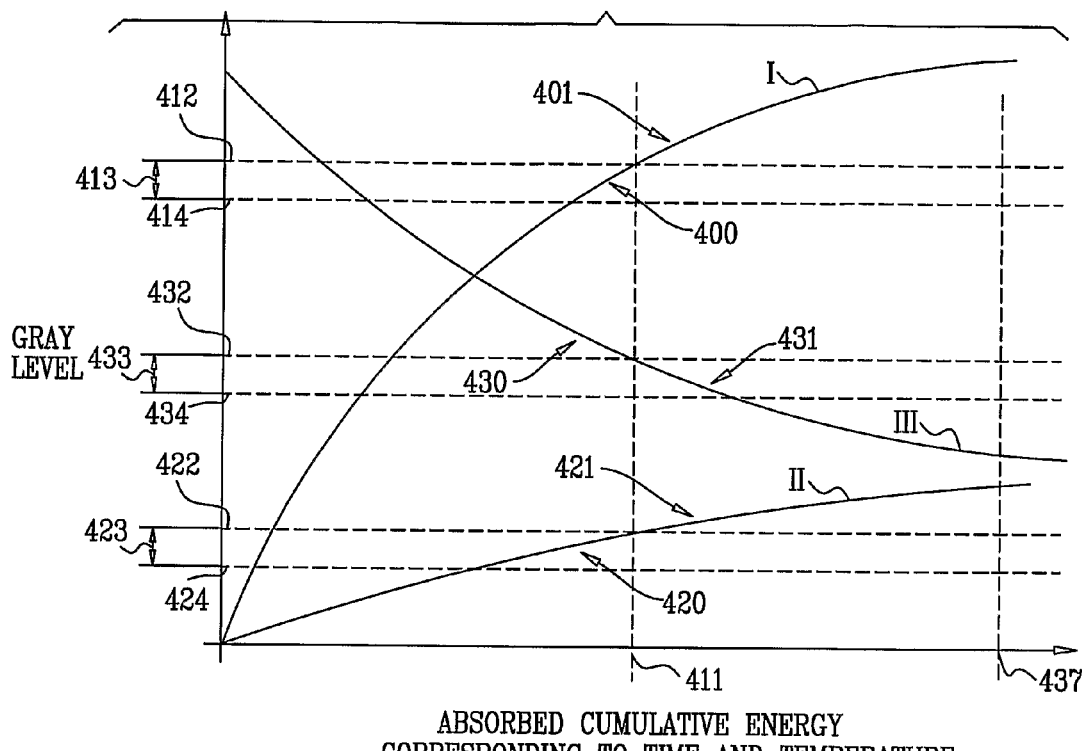
FIGS. 4A and 4B are simplified illustrations of thermochromic characteristics of a plurality of different thermochromic materials particularly useful in the embodiment of FIGS. 1A-3B.
Figure 4A:
Figure 4A:
Figure 4A:
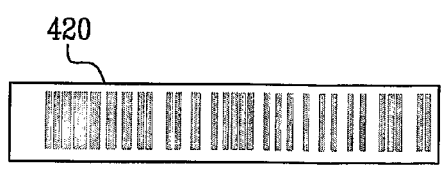
Figure 4A:
Figure 4A:
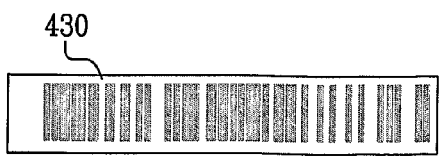
Figure 4A:
Figure 4B:
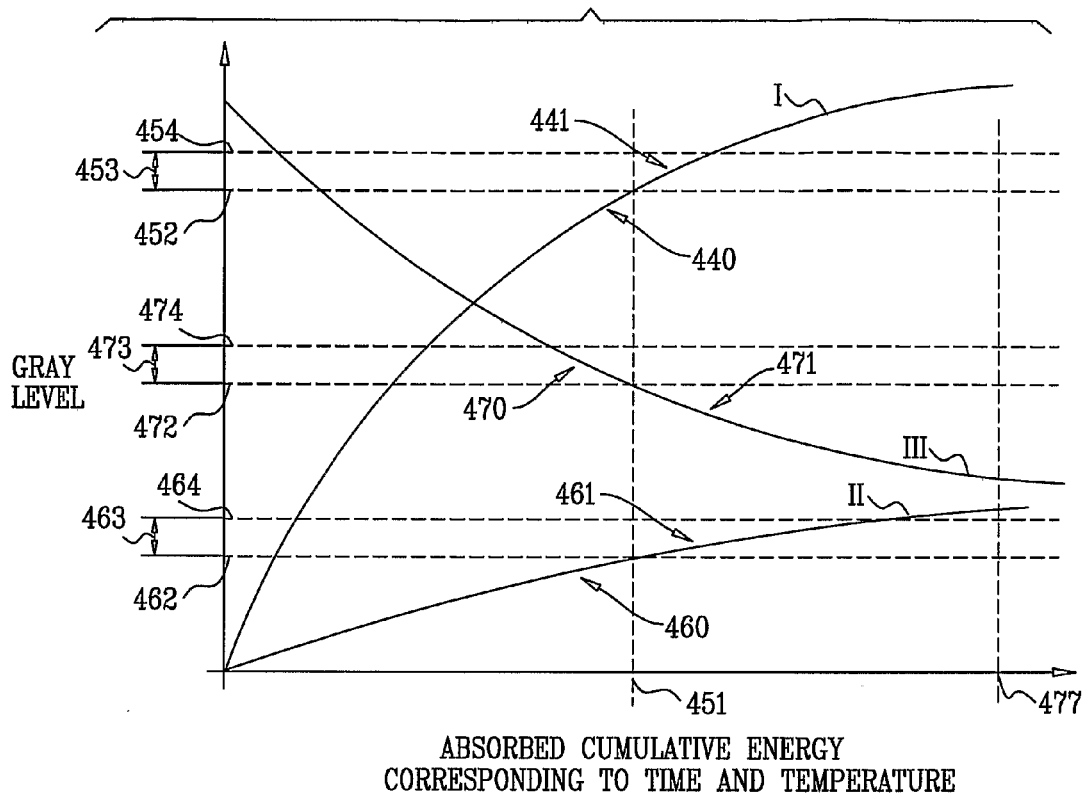
Figure 4B:
Figure 4B:
Figure 4B:
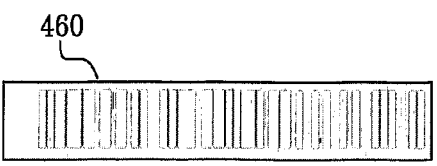
Figure 4B:
Figure 4B:
Figure 4B:

It is also appreciated, as illustrated in FIGS. 4A and 4B, that a digit can also be replaced with another digit by deleting bar widths.

The indicator reader is operative to read the barcoded quality indicators and to provide output indications based on a difference between the visually-sensible characteristics of the barcode and the visually-sensible characteristics of the background. It is appreciated that, as explained hereinbelow with reference to FIG. 4, different states of the variable visually-sensible characteristics of the selectably appearing portions of the barcode can be made readable by the indicator reader by selecting suitable visually-sensible characteristics for the background.

Printing of the plurality of bars in the at least one selectably appearing barcode portion comprises selection of at least one ink based on a material having at least one predetermined variable visually-sensible characteristic which varies in a predetermined manner in response to a predetermined change in a predetermined product quality affecting parameter.

In a preferred embodiment, printing of the plurality of bars in the at least one selectably appearing barcode portion comprises overprinting multiple inks on at least one of the plurality of bars.

Printing of the background of the indicator and the plurality of bars in the fixed barcode portion comprises selection of at least one ink based on at least one material having a visually-sensible characteristic which is not variable in the same way as is the variable visually sensible characteristic in the selectably appearing portions of the barcode. An algorithm useful for the selection of inks for printing the indicator is described hereinbelow with reference to FIG. 5.

Preferably, each of the selectable visually-sensible characteristics of the background renders a predetermined state of the variable visually-sensible characteristic of a selected ink machine-readable by establishing a machine-readable difference between the visually-sensible characteristics of the background and the predetermined state of the variable visually-sensible characteristic of the selected ink. Accordingly, since the variable visually-sensible characteristic of the selected ink assumes the predetermined state in response to a predetermined change in a product quality affecting parameter, each combination of a selected visually-sensible characteristic for printing the background and a selected ink for printing a selectably appearing barcode region corresponds to a different operational range of product quality affecting parameters.

The visually-sensible characteristics of the plurality of bars in both the fixed and the selectably appearing portions of the barcode and the visually-sensible characteristics of the background may be colors or shades of gray and different states of a visually-sensible characteristic may be, for example, transparent, black and shades of gray.

Preferably, the visually-sensible characteristic of the plurality of bars in the at least one selectably appearing portion of the barcode is generally transparent immediately after printing thereof, and it becomes increasingly darker in response to a change in a product quality affecting parameter. It is appreciated that once the visually-sensible characteristic of the plurality of bars in the at least one selectably appearing portion of the barcode is dark enough to establish barcode-reader readable contrast with the visually-sensible characteristic of the background, the differences between the visually-sensible characteristics of the barcode and the visually-sensible characteristics of the background are readable by a conventional barcode reader.

In a preferred embodiment of the present invention the product quality affecting parameters are combinations of time and temperature. Preferably, the ink based on a material having at least one variable visually-sensible characteristic is a thermochromic ink.

Thermochromic inks of two types are generally available: inks which generally display a change between a generally transparent form and a colored form depending on temperature, and inks which generally display different colors at different temperatures. The examples of the present application illustrate the use of the first type of thermochromic ink, which is generally transparent at a low temperature and becomes increasingly dark with an increase in a combination of time and temperature. The final state of the ink in the examples of the present application is black.

It is appreciated that due to the nature of thermochromic materials the thresholds for which indication of exceedance is provided are thresholds of a certain energy level corresponding to a combination of time and temperature, rather than certain amounts of time or certain temperatures. Accordingly, the same energy level can be associated with a longer duration at a lower temperature or with a shorter duration at a higher temperature. For example, if an indicator is designed to provide an indication of exceedance of four degrees Celsius for five days, and during that time the temperature reaches, for example, 15 degrees Celsius, the indicator may provide the "five days at four degrees Celsius" exceedance indication even if five days have not elapsed, since the indicator experienced a temperature over a time which is at least energetically equivalent to five days at four degrees Celsius.

The quality indicator is preferably operative to provide a machine-readable indication only following actuation thereof. In a preferred embodiment, actuation is achieved by exposure of the quality indicator to UV radiation.

It is appreciated that the indicator may provide a changeable barcode having a visible pre-actuation state, a different visible post-actuation state and at least one visible state indicating exceedance of a corresponding one of at least one threshold. In a preferred embodiment the various states are preferably all machine-readable by a conventional barcode reader. However one or more of the states may not be machine-readable by the conventional barcode reader and the fact that they cannot be read provides status information. For example, various situations in which a product is not to be sold or used may be indicated as non-readable states of the indicator.

Preferably, irradiation with UV light may actuate the material in at least one of the at least one selectably appearing portions of the indicator without causing a direct change in the visually-sensible characteristic thereof, and the visually-sensible characteristic of the actuated material changes from the pre-actuation state to the post-actuation state in response to ambient conditions at the time of actuation. Alternatively, irradiation with UV light may directly cause the visually-sensible characteristic of the material in at least one of the selectably appearing portions of the indicator to change from the pre-actuation state to the post-actuation state.

Turning now to FIGS. 1A-1F, the present invention is illustrated in the context of a typical application, here a meat processing plant. A barcoded quality indicator 100 is attached to or otherwise incorporated into each package 101 of processed meat. A package bearing a barcoded quality indicator 100 is typically an individual package suitable for retail sale.

In accordance with a preferred embodiment of the present invention, the indicators 100 may be produced and/or actuated at the same location or at a location adjacent that at which the indicators 100 are associated with packages 101. A suitable quality indicator producing functionality is indicated by reference numeral 102, and is, for example, a printer including print heads containing a plurality of inks based on materials having variable visually-sensible characteristics, such as thermochromic inks, and conventional non-variable inks. Preferably, the quality indicator producing functionality 102 is operative to print the changeable barcode which has at least one variable visually-sensible characteristic which changes in response to a change in a product quality affecting parameter and the background of the indicator which has at least one selectable visually-sensible characteristic which is not variable in the same way as is the barcode. It is appreciated that the quality indicator producing functionality 102 may be associated with an actuator, which is operative to actuate the barcoded quality indicator preferably by exposing it to UV radiation. It is further appreciated that the actuator may be automatic and may actuate the indicator after it has been produced by quality indicator producing functionality 102. Additionally or alternatively, the quality indicator producing functionality 102 may be associated with a computer including software operative to select the inks for producing the barcoded quality indicators. An algorithm which may be carried out by this software is described hereinbelow with reference to FIG. 5.

As seen in FIG. 1A, additional barcoded quality indicators 103, which are preferably different from the quality indicators 100, are attached to or otherwise incorporated into cartons 104 containing packages 101 of processed meat bearing quality indicators 100. Preferably, the indicators 103 are printed by a quality indicator producing functionality 105 which is similar to the quality indicator producing functionality 102, but is placed at a location which is different from the location of quality indicator producing functionality 102. Alternatively, the indicators 103 may be printed by the quality indicator producing functionality 102.

Different types of indicators may be employed for different types of packages. For example, the indicator used on a carton containing a plurality of individual packages may be more or less accurate or have a greater or lesser dynamic range of indications than the indictor used on an individual package. For example, the indicator on a carton may include an indicator capable of indicating exceedance of additional thresholds, not included on the indicators of individual packages contained therein, or fewer thresholds than the indicators of individual packages contained therein.

Figure 1B:
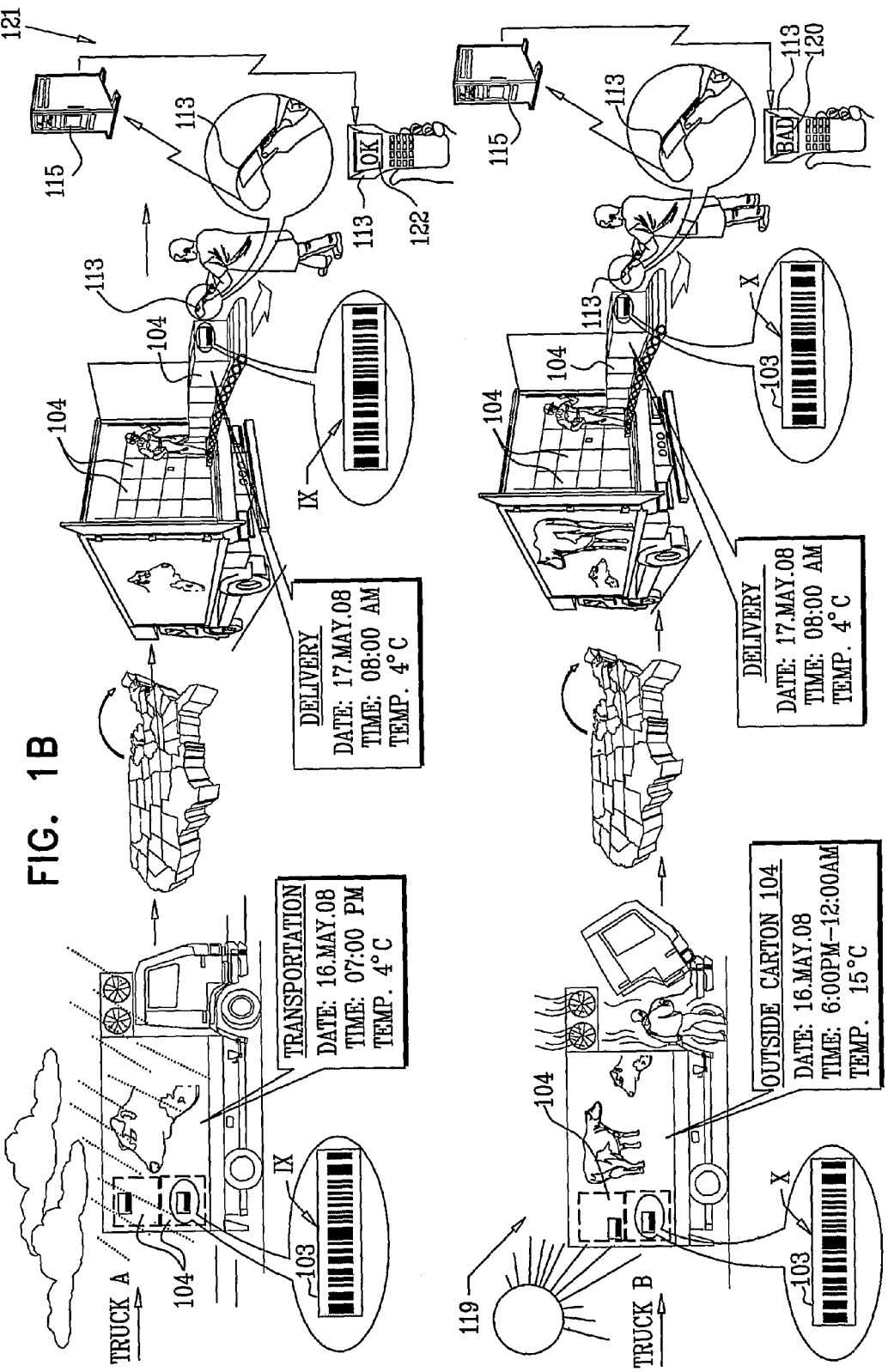

In a preferred embodiment illustrated in FIGS. 1A-1B, the indicators 103 are operative to provide indication of exceedance of thresholds in a range of product quality affecting parameters different from the range for which indication of exceedance is provided by the indicators 100. In a preferred embodiment of the present invention which is illustrated in FIGS. 1A-1C, the barcodes of the indicators 100 are printed using the same thermochromic materials as the barcodes of the indicators 103. However, the background of the indicators 100 is printed using a material with at least one visually-sensible characteristic which is different from the visually-sensible characteristic of the material used to print the background of the indicators 103. In the illustrated embodiment, the background of the indicators 100 is white and the background of the indicators 103 is gray.

Alternatively, the indicators 100 may be printed using materials with thermochromic characteristics different from the thermochromic characteristics of the materials used to print the indicators 103. Additionally, the visually-sensible characteristic of the background of the indicators 100 may be the same as the visually-sensible characteristics of the background of the indicators 103.

In the illustrated embodiment, the indicators include an EAN (European Article Number) barcode. The indicators 100 are typically actuatable by irradiation of the indicator with UV light, as indicated by reference numeral 107. In the illustrated embodiment, the indicators 100 have a visible pre-actuation state I, a different visible post-actuation state II, and a visible state III indicating exceedance of a predetermined temperature and time combination threshold, for example three hours at 12 degrees Celsius, as seen at reference numeral 125 in FIG. 1C. The quality indicators 100 preferably also have an additional visible state IV, indicating the elapse of a predetermined amount of time since manufacture or other actuation of the quality indicator, for example one week at a storage temperature, as seen at reference numeral 134 in FIG. 1C, and an additional visible state V, indicating the elapse of an additional amount of time, for example another week at a storage temperature, as seen at reference numeral 138 in FIG. 1D. The quality indicators 100 can have yet a further visible state VI, indicating the exceedance of a predetermined combination of a temperature and a short duration, for example thirty minutes at 40 degrees Celsius, as seen in FIG. 1E, and another visible state VII, indicating the elapse of one year since manufacture or other actuation of the quality indicator at a storage temperature, as seen in FIG. 1F.

The visible states are preferably readable by a barcode reader. For example, in this illustrated embodiment, the pre-actuation state I is read as 7431348787736, the post-actuation state II is read as 7811348787736, the visible state III is read as 7811362787736, the visible state IV is read as 7811348927736, the visible state V is read as 7811348922236, the visible state VI is read as 7817548787736 and the visible state VII is read as 7811362922250. It is appreciated that additional states of the quality indicator not presented in the illustrated embodiment may be indicated by combinations of the states described above. For example, when the indicator is exposed to one hour at 40 degrees Celsius, the threshold of one hour at 25 degrees Celsius is exceeded and causes the quality indicator to assume the visible state III. However, the threshold of 30 minutes at 40 degrees is also exceeded and causes the quality indicator to assume the visible state VI. Therefore, this combined exceedance is indicated by a visible state which combines the visible state III and the visible state VI, and is read by a barcode reader as 7817562787736. It is further appreciated that the various visible states may occur in any suitable order and not necessarily in the order indicated by their numbering.

As further seen in FIG. 1A, The indicators 103 are typically actuatable by irradiation of the indicator with UV light, as indicated by reference numeral 109. In the illustrated embodiment, the indicators 103 preferably have a visible pre-actuation state VIII, typically readable by a barcode reader as 7431348787750. Indicators 103 preferably have a visible post-actuation state IX which is different from pre-actuation state VIII and is typically readable by a barcode reader as 7437548787750. Indicators 103 preferably also have an additional at least one visible state X as seen, for example, at reference numeral 110 in FIG. 1A and at reference numeral 119 in FIG. 1B, indicating exceedance of a predetermined temperature and time combination threshold, for example five hours at 12 degrees Celsius. This further visible state is typically readable by a barcode reader as 7437548782250.

Alternatively, any of the visible states VIII, IX and X of the quality indicators 103 may be associated with barcodes which are the same as barcodes associated with states of the quality indicators 100. If the same barcode is associated with states of both types of indicators, then the identity of the quality indicator read by a barcode reader is provided to the indication interpreter by another method, for example by a manual entry to the database.

It is appreciated that the predetermined temperature and time combination thresholds may be selected as appropriate for a given application.

It is appreciated that as long as the temperature of the packages 101 does not exceed a predetermined temperature and time combination threshold, for example three hours at 12 degrees Celsius, and one week at a storage temperature has not elapsed since manufacture or other actuation of the quality indicators, the indicators 100 remain in the visible state II.

As seen in FIG. 1A, as long as the temperature of the cartons 104 does not exceed a predetermined temperature and time combination, for example five hours at 12 degrees Celsius, the quality indicators 103 remain in the visible state IX.

As further seen in FIG. 1A, if during loading of truck A as indicated by reference numeral 110, the temperature on the outside of one or more cartons 104 is 30 degrees Celsius for a period of five and a half hours, which is more then the predetermined time and temperature combination threshold of five hours at 12 degrees Celsius, the corresponding indicators 103 assume the further visible state X. This further visible state X does not revert to the visible state IX notwithstanding that the temperature of the carton 104 subsequently drops below the predetermined temperature. These cartons, when received by the customer, will be subject to inspection to determine whether the temperature of the packages 101 inside the cartons 104 exceeded a predetermined time and temperature combination threshold.

Accordingly, upon inspection, as upon delivery, the quality indicators 103 attached to the cartons 104 which were exposed to a temperature of 30 degrees Celsius for a period of five and a half hours may be read by an inspector using a conventional barcode reader 113. The barcode in its visible state X preferably provides information to the quality indication computer 115 which enables the indication interpreter forming part thereof to provide an immediate indication of a quality status, such as a BAD indication 116. This BAD indication 116 indicates that at some time in the history of the quality indicator 103, the carton 104 to which it was attached experienced a temperature over a time which is at least energetically equivalent to the predetermined temperature and time combination threshold and that this event may have rendered one or more of the products in carton 104 unacceptable for sale.

Should the quality indicator 103 be in the visible state VIII, indicating that proper actuation of the quality indicator 103 did not occur, a NON-ACTUATED indication or a BAD indication 116 may be provided to an inspector or other interested party.

It is appreciated that until the cartons 104 are opened, which normally occurs only upon delivery, it is impractical to visually inspect the indicators 100 which are attached to the individual packages 101 inside the cartons 104. Depending on the circumstances, the temperature of the individual packages 101 within a carton 104 may or may not have exceeded the predetermined time and temperature combination threshold of three hours at 12 degrees Celsius and the indicators 100 which are attached to the packages 101 may or may not be in the further visible state III. This normally can only be seen upon opening the cartons 104 as shown in FIG. 1C.

It is a particular feature of the present invention that the time and temperature thresholds of the quality indicators 100 and 103, placed on the individual packages and the cartons containing them respectively, are preferably related in order to provide highly effective cold chain management. It is preferable that indicators 103 provide a time and temperature combination threshold exceedance warning even if, upon inspection, the indicators 100 show that the individual packages 101 have not experienced unacceptable temperatures. In order that an unacceptable rate of false alarms not occur, the thresholds of the indicators 103 and 100 are preferably calibrated with respect to each other based, inter alia, on empirical data.

As further seen in FIG. 1A, if during loading of truck B, the ambient temperature on the outside of truck B reaches 25 degrees Celsius for one hour, which is less than the predetermined duration of five hours, the quality indicators 103 remain in visible state IX, as seen at reference numeral 117.

At any stage, such as upon delivery, the quality indicators 103 can be read with a conventional barcode reader 113, which preferably communicates with a remote quality indication computer 115 and provides an immediate indication of a quality status, such as an OK indication 118, to an inspector. It is appreciated that normally until delivery, it is impractical to visually inspect the indicators 100.

As stated above with relation to loading of truck A as indicated by reference numeral 110, it is preferable that the indicators 103 provide a time and temperature combination threshold exceedance warning even if, upon inspection, the indicators 100 show that the individual packages 101 have not experienced unacceptable temperatures for unacceptable durations. Accordingly upon subsequent reading of the indicators 100 on the packages 101 inside a carton 104 for which no such warning was provided, as indicated by reference numeral 123 in FIG. 1C, it is not expected that the indicators 100 will indicate exceedance of corresponding time in temperature thresholds.

As seen in FIG. 1B, if during vehicle breakdown of truck B, the ambient temperature outside of the cartons 104 is 15 degrees Celsius for six hours which is more than the predetermined temperature and time combination threshold of five hours at 12 degrees Celsius, the quality indicators 103 assume the further visible state X, as seen at reference numeral 119. This visible state X does not revert to the visible state IX notwithstanding that the temperature of the cartons 104 subsequently drops below the predetermined temperature.

Accordingly, upon inspection, as upon delivery, upon reading the quality indicators 103 by an inspector using a conventional barcode reader 113, the barcode in its visible state X preferably provides information to the quality indication computer 115 which enables the indication interpreter forming part thereof to provide an immediate indication of a quality status, such as a BAD indication 120. This BAD indication 120 indicates that at some time in the history of the quality indicator 103, the carton 104 to which it was attached experienced a temperature over time which is at least energetically equivalent to the predetermined temperature and time combination threshold and that this event may have rendered one or more of the products in carton 104 unacceptable for sale. It is appreciated that normally until cartons 104 are opened, typically following delivery, it is impractical to visually inspect indicators 100.

Depending on the circumstances, the temperatures of the individual packages 101 within the cartons 104 may or may not have exceeded 12 degrees Celsius for three hours and the quality indicators 100 which are attached to the packages 101 may or may not be in the further visible state III. This normally can only be seen upon opening cartons 104 as shown in FIG. 1C.

As further seen from FIG. 1B and indicated by reference numeral 121, upon inspection, as upon delivery, the quality indicators 103 attached to the cartons 104 which were delivered by truck A may be read by an inspector using a conventional barcode reader 113. As indicated by reference numeral 110 in FIG. 1A with relation to loading of truck A, one or more cartons 104 were exposed to a temperature of at least 30 degrees Celsius for a period of five and a half hours, and the quality indicators 103 of these cartons assumed the visible state X, indicating exceedance of a time and temperature combination threshold.

In contrast, as indicated by reference numeral 121, the quality indicators 103 of other cartons 104 which were not exposed to a temperature of at least 30 degrees Celsius for a period of five and a half hours remained in the visible state IX. The barcode in its visible state IX preferably provides information to the quality indication computer 115 which enables the indication interpreter forming part thereof to provide an immediate OK indication 122.

Should the quality indicator 103 be in the visible state VIII, indicating that proper actuation of the quality indicator 103 did not occur, a NON-ACTUATED indication or a BAD indication 120 may be provided to an inspector or other interested party.

Turning now specifically to FIG. 1C, it is seen that upon opening the cartons 104 of packages 101 which were delivered by truck B, as indicated by reference numeral 123, the quality indicators 100 attached to the packages 101 are read by a conventional barcode reader 113. In this example, the quality indicators 100 of some of packages 101 are in the visible state II, indicating that notwithstanding that an indicator 103 on a carton 104 indicates exceedance of a time and temperature combination threshold, some of the packages, particularly those at the interior of the carton, may not have exceeded a corresponding time and temperature combination threshold and may be acceptable for sale.

Barcode reader 113 preferably communicates with a remote quality indication computer 115 and provides an immediate OK indication 124 to an inspector, indicating that the temperature of some of packages 101 did not exceed a predetermined temperature and time combination threshold, for example three hours at 12 degrees Celsius.

This OK indication is in contrast to the BAD indication 120 provided by the quality indicators 103 associated with the cartons 104 containing these packages 101 as the result of refrigeration breakdown of truck B, as indicated by reference numeral 119 in FIG. 1B. As stated above with relation to truck A loading indicated by reference numeral 110, it is preferable that the indicators 103 provide a time and temperature combination threshold exceedance warning even if, upon inspection, the indicators 100 show that the individual packages 101 have not experienced unacceptable temperatures.

It is further stated above that in order that an unacceptable rate of false alarms not occur, the thresholds of indicators 103 and 100 are preferably calibrated with respect to each other based, inter alia, on empirical data, and not necessarily as indicated in the example of FIGS. 1A-1F, which is provided for illustration purposes. For example, a BAD indication for a carton 104 containing packages 101 all having an OK indication can be prevented if indicators 103 attached to the cartons 104 are calibrated to indicate the exceedance of a higher temperature and time combination threshold than that of indicators 100 on packages 101.

As further seen in FIG. 1C and indicated by reference numeral 125, upon opening the cartons 104 of packages 101 which were delivered by truck A and for which a BAD indication has already been provided by the quality indicators 103 associated therewith during loading of truck A, as indicated by reference numeral 110 in FIG. 1A, it is seen that the indicators 100 assumed during transport a further visible state III. It is appreciated that once the state III is reached, the quality indicator 100 preferably does not thereafter revert to the state II notwithstanding that the temperature of the package 101 subsequently drops below the predetermined temperature.

Accordingly, upon inspection, as upon delivery, upon reading the quality indicator 100 by an inspector using a conventional barcode reader 113, the barcode in its visible state III preferably provides information to the quality indication computer 115 which enables the indication interpreter forming part thereof to provide an immediate indication of a quality status, such as a BAD indication 127. This BAD indication 127 indicates that at some time in the history of the quality indicator 100, the package 101 to which it was attached experienced a temperature over time which is at least energetically equivalent to the predetermined temperature and time combination threshold, and that this event has rendered the product in package 101 unacceptable for sale.

Should the quality indicator 100 be in the visible state I, indicating that proper actuation of the quality indicator 100 did not occur, a NON-ACTUATED indication or a BAD indication 127 may be provided to an inspector or other interested party.

As indicated above, the selectably appearing portions of the barcode of the indicators 100 are preferably printed using the same thermochromic materials as the selectably appearing portions of the barcode of the indicators 103. It is appreciated that after three hours at 15 degrees Celsius the gray level of the thermochromic material used for printing the indicators 100 and 103 is dark enough to establish a barcode-reader readable contrast with the white background of the indicator 100 but not with the gray background of the indicator 103. Accordingly, an indication of exceedance will be provided after three hours at 15 degrees Celsius only by indicator 100, while indicator 103 will provide an indication of exceedance only following a further exposure of two additional hours at 15 degrees Celsius, at which time barcode-reader readable contrast will be established with the gray background.

It is appreciated, as discussed in more detail with reference to FIG. 6 below, that whereas machine reading of the quality indicators 100 and 103 provides an indication of whether or not a given event has occurred, the indication of a quality status by the quality indication computer 115 provides an indication of whether and to what extent that event has affected the quality of a given product with which the quality indicator 100 or the quality indicator 103 are associated. It is appreciated that there may be a great variation in the effect of a given event depending on the type of product. Thus, for example, exposure to 12 degrees Celsius for three hours may cause fresh meat to be rendered unfit for sale but may not appreciably affect the quality or saleability of oranges.

As further seen in FIG. 1C, a user employing an imager-equipped telephone or other suitable mobile communicator 128 may image the quality indicator 100 and communicate the image information to a suitably programmed quality indication computer 130, which may be identical to the computer 115, and which is capable of reading the barcode from the image information and providing to the user, via SMS or any other suitable communication methodology, an immediate indication of a quality status, such as a GOOD QUALITY indication 132. This quality status indicates that the product is safe for use. Alternatively, if the user employs a barcode reader-equipped communicator, the communicator can provide to the computer 115 an output resulting from reading the barcode.

It is appreciated that quality indication computer 130 may provide reports to various interested entities, such as the manufacturer or distributor of the products, health authorities and other governmental or private entities, to enable real-time monitoring of the quality of products offered for sale. The quality indication computer 130 may have caller ID functionality so as to be able to identify the caller, classify the caller, for example as a customer, a manufacturer's QA inspector and a health inspector, and provide an appropriate quality indication output. Additionally or alternatively, the quality indication computer 130 may send messages to supermarket management regarding remedial steps to be taken, such as refrigeration maintenance or repair instructions.

Figure 1D:
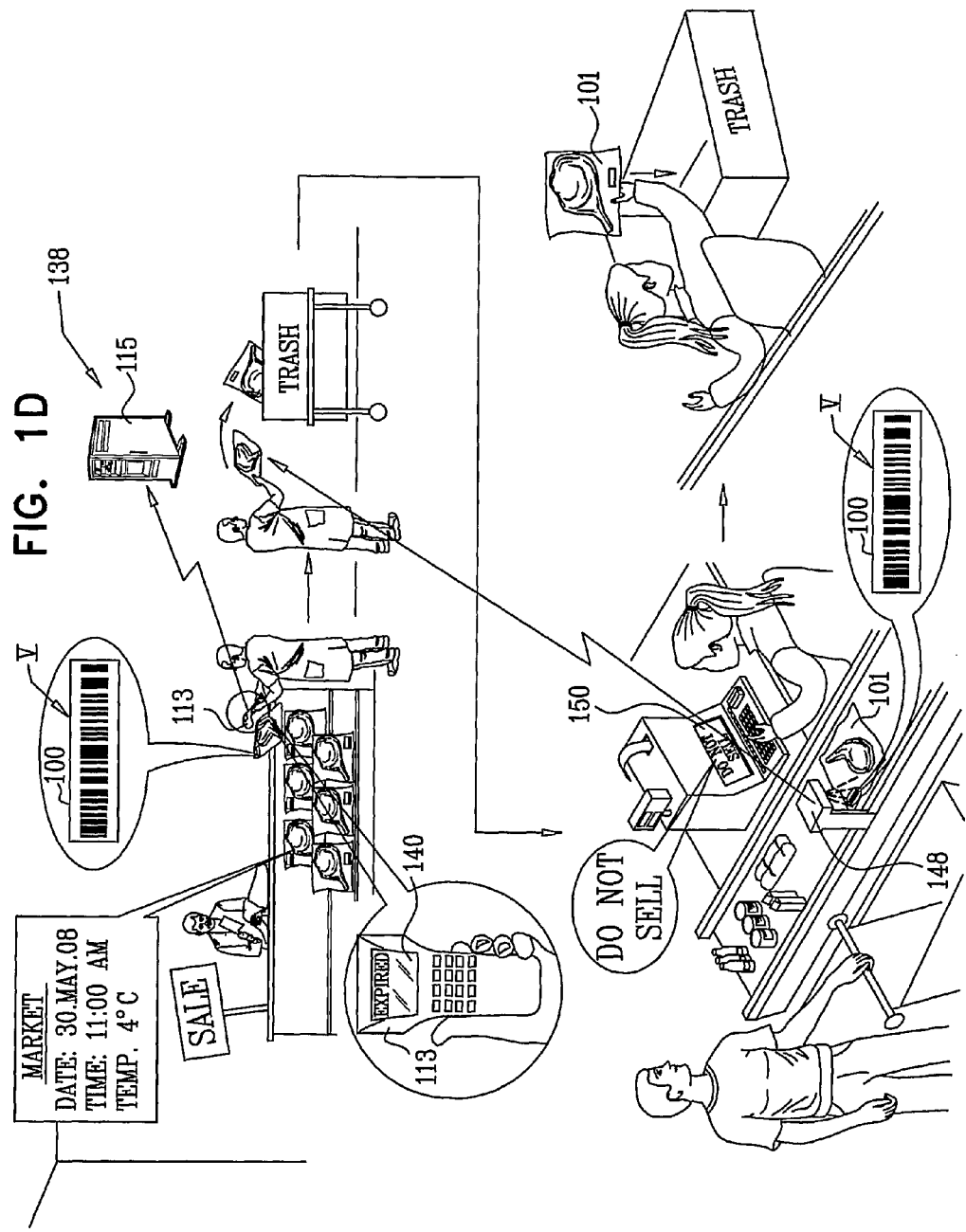
Figure 1E:
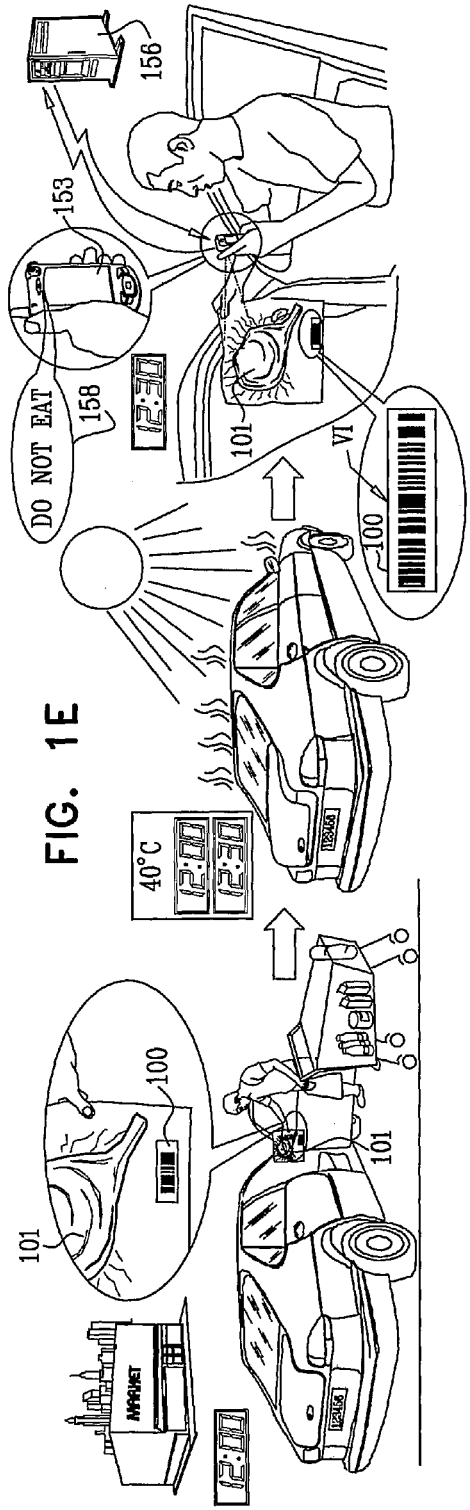
Figure 1F:
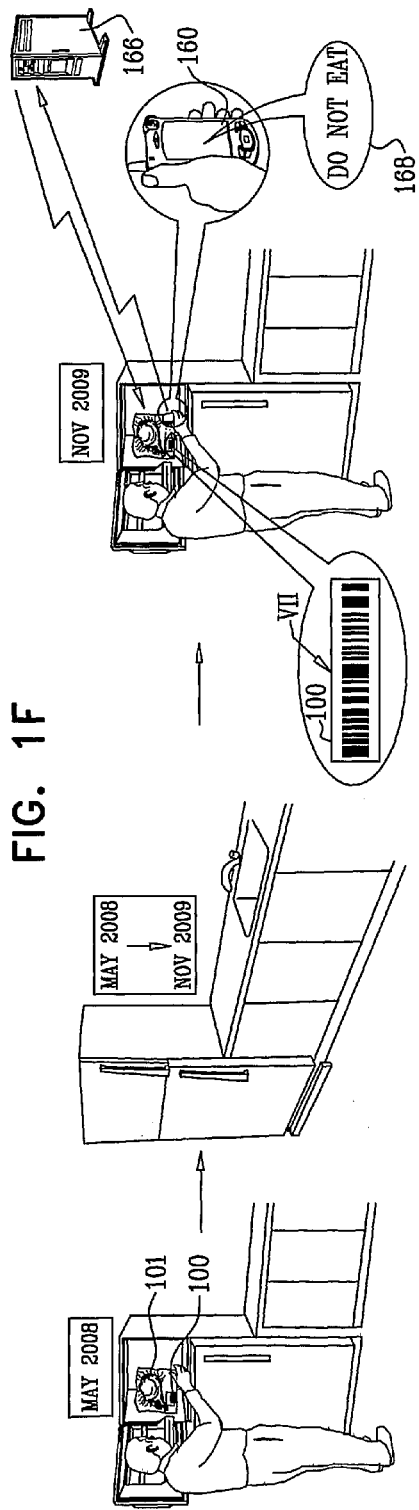

Turning now specifically to FIGS. 1C and 1D, it is seen that indicator 100 may additionally and independently serve to indicate elapsed time at a storage temperature. Thus, upon exceedance of the predetermined time period, for example one week at a storage temperature, following manufacture or other actuation of the quality indicator 100, the quality indicator 100 assumes yet a further visible state IV, as seen at reference numeral 134 in FIG. 1C. Upon elapse of a further predetermined amount of time, typically a second week at a storage temperature, the quality indicator 100 may assume a still further visible state V, as seen at reference numeral 138 in FIG. 1D.

Accordingly, upon inspection, as indicated by reference numeral 134, as upon periodic stock inspection at a retail site, upon reading the quality indicator 100 by an inspector using a conventional barcode reader 113, the barcode in its visible state IV provides information to the quality indication computer 115 which enables the indication interpreter forming part thereof to provide an immediate indication of a quality status, such as a SELL SOON indication 136. This SELL SOON indication 136 indicates that, since the predetermined time interval has elapsed, the package 101 to which it was attached should be positioned and/or priced for immediate sale.

It is seen in FIG. 1D that upon further inspection, as indicated by reference numeral 138, as upon periodic stock inspection at the retail site, upon reading the quality indicator 100 by an inspector using a conventional barcode reader 113, the barcode in its visible state V provides information to the quality indication computer 115 which enables the indication interpreter forming part thereof to provide an immediate indication of a quality status, such as an EXPIRED indication 140. This EXPIRED indication 140 indicates that the package 101 to which it was attached should be discarded, since the further predetermined time period has elapsed.

Additionally or alternatively, the further inspection may take place automatically at the checkout, where the quality indicator 100 is read by a checkout scanner 148. In such a case, the barcode in its visible state V provides information to the quality indication computer 115 which enables the indication interpreter forming part thereof to provide an immediate indication of a quality status, such as a DO NOT SELL indication 150, to the checkout clerk. This DO NOT SELL indication 150 indicates that the package 101 to which it was attached may not be sold since the further predetermined time period has elapsed. It is appreciated that the DO NOT SELL indication functionality described above provides a high level of control in implementing package-specific shelf-life restrictions and thus, by eliminating uncertainty regarding the shelf life of a given product, may enable packaged products which have been maintained under optimal conditions to have longer shelf lives than would otherwise be possible.

Additionally or alternatively, a further inspection prior to the checkout may also be carried out by a customer at a suitable quality check location within the store.

Turning now to FIG. 1E, it is seen that the indicator 100 may additionally and independently serve to indicate exceedance of a predetermined combination of a temperature and a short duration following purchase. Thus, if the package 101 bearing indicator 100 is left inside a vehicle in the sun and is exposed to 40 degrees Celsius for a duration as short as thirty minutes, the quality indicator 100 may assume a further visible state VI. In such a situation, a purchaser, employing an imager-equipped telephone or other suitable mobile communicator 153 may image the quality indicator 100 and communicate the image information to a suitably programmed quality indication computer 156, which may be identical to computer 130 in FIG. 1C, and which is capable of reading the barcode from the image information and providing to the user, via SMS or any other suitable communication methodology, an immediate indication of a quality status, such as a DO NOT EAT indication 158. This quality status indicates that the product is not safe for human consumption. Alternatively, if the user employs a barcode reader-equipped communicator, the communicator can provide to the computer 156 an output resulting from reading the barcode.

Turning now to FIG. 1F, it is seen that indicator 100 may additionally and independently serve to indicate elapsed time at a storage temperature following purchase. Thus, upon exceedance of a predetermined long time period, such as 12 months following manufacture or other actuation of the quality indicator 100, the quality indicator 100 assumes a further visible state VII, which indicates that a predetermined amount of time has elapsed. Such a situation might occur when package 101 bearing indicator 100 is forgotten in a consumer's home freezer. In such a situation, the consumer, employing imager-equipped telephone or other suitable mobile communicator 160 may image the quality indicator 100 and communicate the image information to a suitably programmed quality indication computer 166, which may be identical to the computer 130 in FIG. 1C, and which is capable of reading the barcode from the image information and providing to the user, via SMS or any other suitable communication methodology, an immediate indication of a quality status, such as a DO NOT EAT indication 168. This quality status indicates that the product is not safe for human consumption. Alternatively, if the user employs a barcode reader-equipped communicator, the communicator can provide to the computer 166 an output resulting from reading the barcode.

Figure 2A:
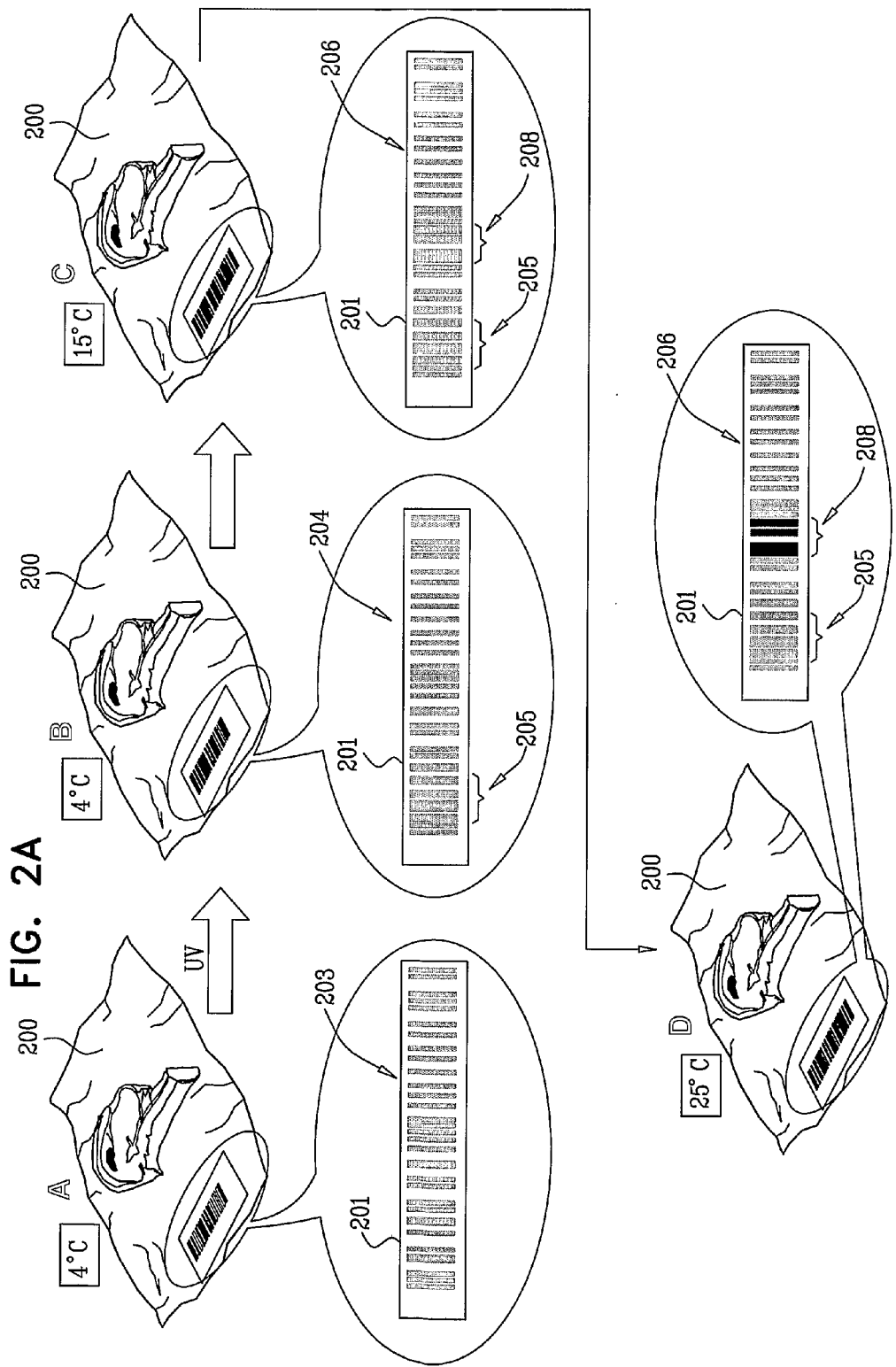

Reference is now made to FIGS. 2A-2B, which are simplified illustrations of a quality indicator constructed and operative in accordance with a preferred embodiment of the present invention for indicating combined time and temperature history within a first operational range;

FIG. 2A illustrates a package of meat 200 including a quality indicator 201 constructed and operative in accordance with a preferred embodiment of the present invention of the type described hereinabove with reference to FIGS. 1A-1F. The indicator 201 is typically constructed to be actuatable by irradiation of the indicator with UV light.

As illustrated in FIG. 2A, the indicator 201 includes a barcode which is in a visible state 203, typically read by the barcode reader as 7431348787736, prior to actuation, as indicated by designator A. The barcode of indicator 201 preferably includes selectably appearing portions 205 and 208, preferably including thermochromic materials and preferably having at least a first visible state and a second visible state which is different from the first visible state. Preferably, the thermochromic characteristics of the thermochromic material in the selectably appearing portion 208 are different from the thermochromic characteristics of the thermochromic material in the selectably appearing portion 205 of the barcode. Preferably, the background of indicator 201 is white.

The selectably appearing portions 205 and 208 of the barcode including the thermochromic materials are in the first visible state prior to actuation of the indicator, and the thermochromic materials therein are preferably generally transparent. Following actuation, the selectably appearing portion 205 of the barcode including the thermochromic material assumes the second visible state preferably by immediately darkening to create barcode-reader readable contrast with the white background, and indicator 201 presents a barcode which is in a second visible state 204, typically readable by a barcode reader as 7811348787736 including the darkened portion 205 as long as the package 200 has not been exposed to a predetermined temperature, for example 15 degrees Celsius, as indicated by designator B.

Once the temperature of the package 200 has reached 15 degrees Celsius the selectably appearing portion 208 including the thermochromic material assumes the second visible state preferably by darkening to create barcode-reader readable contrast with the white background, and the indicator presents a barcode which is in a third visible state 206, typically readable by a barcode reader as 7811362787736, including the darkened portions 205 and 208, as indicated by designator C.

It is appreciated that once the state 206 is reached, the indicator preferably does not thereafter revert to the state 204 notwithstanding that the temperature of the package 200 subsequently returns to 4 degrees Celsius.

It is appreciated, although not explicitly shown, that when exposed to a temperature of less than 15 degrees Celsius the thermochromic material in portion 208 of the barcode may assume a shade of gray which is not dark enough to create barcode-reader readable contrast with the background, and the barcode preferably remains at visible state 204.

According to an embodiment indicated by designator D, after the indicator 201 presents a barcode which is in the visible state 206 portion 208 may continue to darken, for example in response to a further increase in temperature. Preferably, this further darkening of the portion 208 does not affect the readability of the barcode and it remains in state 206. It is also appreciated, although not explicitly shown, that the portion 205 may also continue to darken after the indicator 201 has reaches the visible state 204. Preferably, this further darkening of portion 205 does not affect the readability of the barcode.

FIG. 2B illustrates a package of meat 220 including a combination elapsed time at temperature indicator 221, constructed and operative in accordance with a preferred embodiment of the present invention, of the type described hereinabove with reference to FIGS. 1A-1F. The indicator 221 is typically constructed to be actuatable by irradiation of the indicator with UV light.

As illustrated in FIG. 2B, indicator 221 includes a barcode which is in a first visible state 223, typically readable by the barcode reader as 7431348787736, prior to actuation, as indicated by designator A. The barcode of indicator 221 preferably includes selectably appearing portions 225 and 228, preferably including thermochromic materials and preferably having at least a first visible state and a second visible state which is different from the first visible state. Preferably, the thermochromic characteristics of the thermochromic material in the selectably appearing portion 228 are different from the thermochromic characteristics of the thermochromic material in the selectably appearing portion 225 of the barcode. Preferably, the background of indicator 221 is white.

The selectably appearing portions 225 and 228 of the barcode including the thermochromic materials are in the first visible state prior to actuation of the indicator, and the thermochromic materials therein are preferably generally transparent. Following actuation, the selectably appearing portion 225 of the barcode including the thermochromic material assumes the second visible state preferably by immediately darkening to create barcode-reader readable contrast with the white background, and the indicator 221 presents a barcode which is in the second visible state 224, typically readable by a barcode reader as 7811348787736 including the darkened portion 225 as long as the package 220 is not exposed to a predetermined temperature and time combination, for example, three hours at 15 degrees Celsius, as indicated by designator B.

Once the package 220 is exposed to the predetermined temperature and time combination, for example three hours at 15 degrees Celsius, the selectably appearing portion 228 of the barcode including the thermochromic material assumes the second visible state preferably by darkening to create barcode-reader readable contrast with the white background, and the indicator presents a barcode which is in the third visible state 226, typically readable by a barcode reader as 7 811362787736, including the darkened portions 225 and 228, as indicated by designator C. It is appreciated that once the state 226 is reached, the indicator preferably does not thereafter revert to the state 224 notwithstanding that the temperature of the package 220 subsequently returns to 4 degrees Celsius.

It is appreciated, although not explicitly shown, that if the indicator 221 has been exposed to a temperature of 15 degrees Celsius for less than three hours the thermochromic material in portion 228 of the barcode may assume a shade of gray which is not dark enough to create barcode-reader readable contrast with the background, and the barcode preferably remains at visible state 224.

According to an embodiment indicated by designator D, after the indicator 221 presents a barcode which is in the visible state 226 portion 228 may continue to darken, for example, in response to a further increase in temperature or after the elapse of an additional amount of time. Preferably, this further darkening of portion 228 does not affect the readability of the barcode and it remains in state 226. It is also appreciated, although not explicitly shown, that portion 225 may also continue to darken after the indicator 221 has reached the visible state 224. Preferably, this further darkening of portion 225 does not affect the readability of the barcode.

Figure 3A:
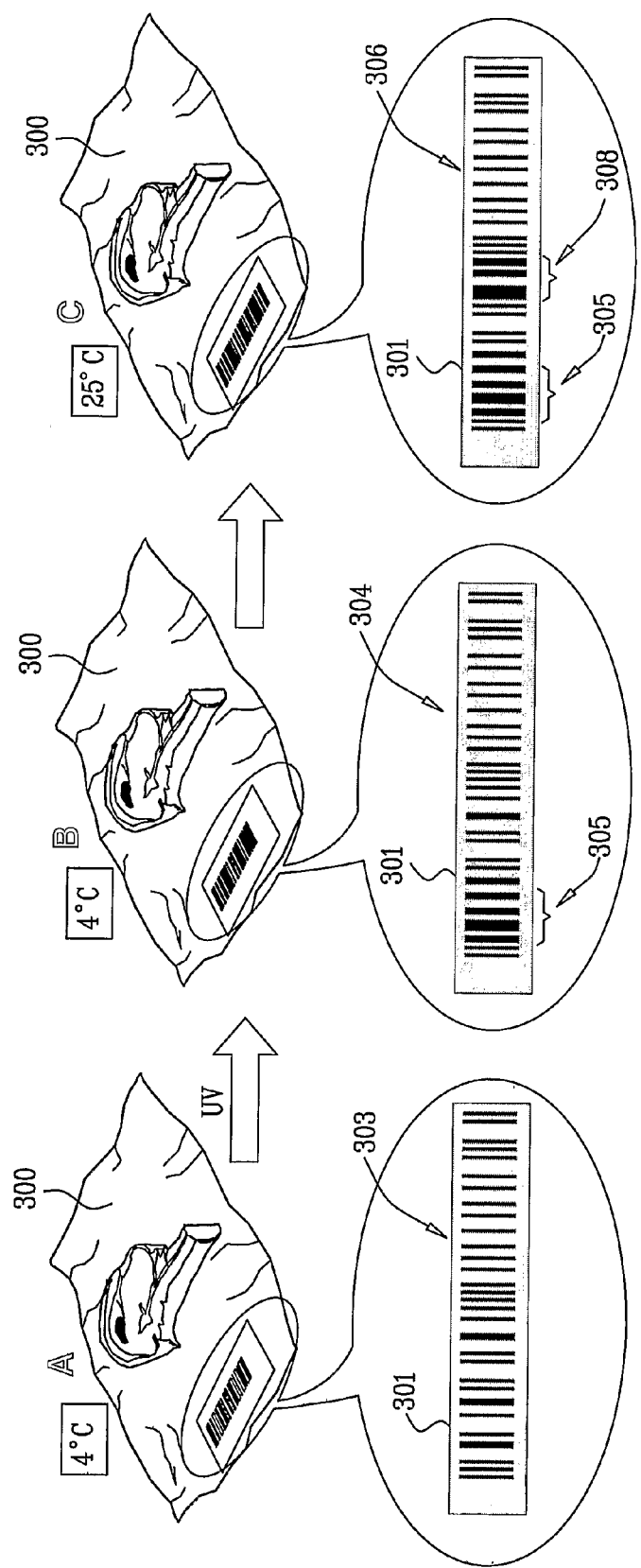
FIGS. 3A and 3B are simplified illustrations of a quality indicator constructed and operative in accordance with a preferred embodiment of the present invention for indicating combined time and temperature history within a second operational range.
Figure 3B:
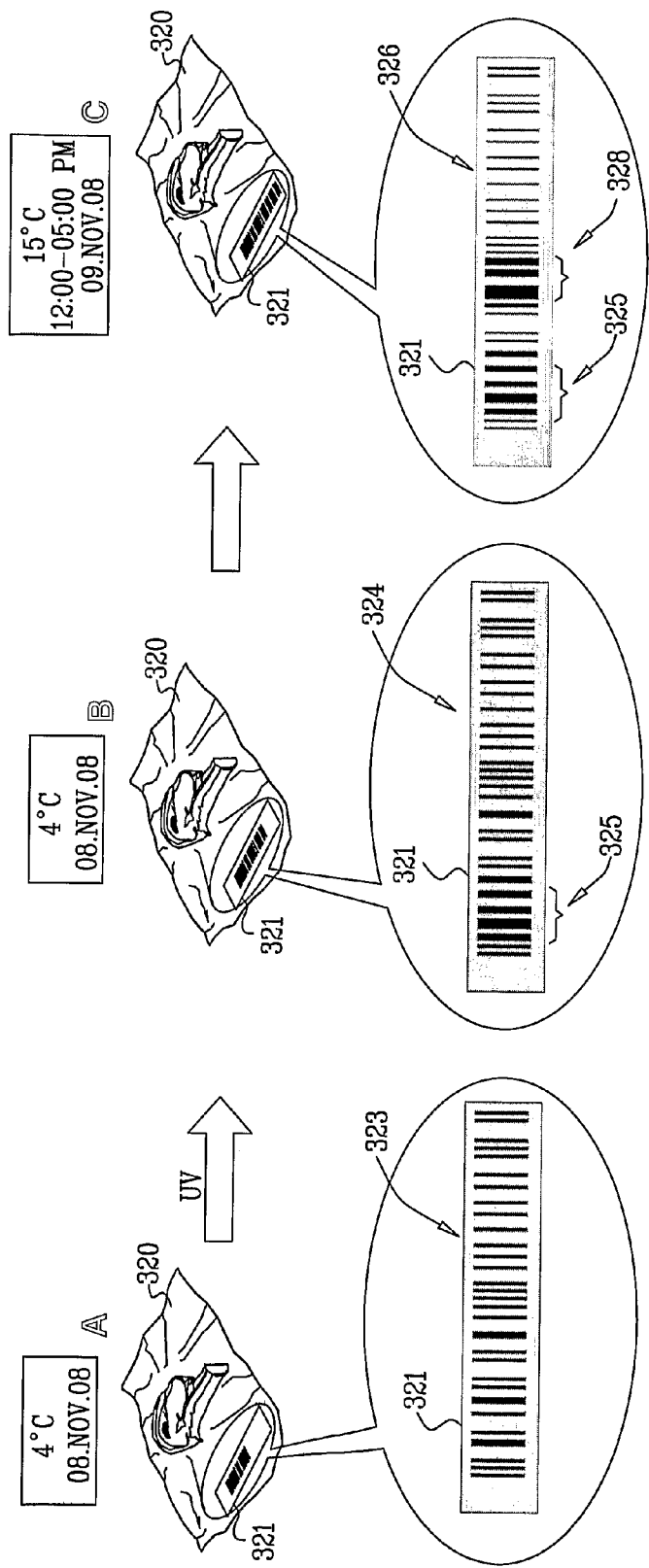

Reference is now made to FIGS. 3A-3B, which are simplified illustrations of a quality indicator constructed and operative in accordance with a preferred embodiment of the present invention for indicating combined time and temperature history within a second operational range;

Preferably, the thermochromic materials in FIGS. 3A-3B are the same as the thermochromic materials in FIGS. 2A-2B, respectively, and the background of the indicator in FIGS. 3A-3B is gray. As indicated hereinabove with reference to FIGS. 1A-1C, each of the selectable visually-sensible characteristics of the background of indicators printed with a selected thermochromic ink preferably corresponds to one of a plurality of operational ranges of product quality affecting parameters. Accordingly, a white background preferably corresponds to an operational range of product quality affecting parameters different from the operational range corresponding to a gray background. Alternatively, the thermochromic materials used for printing the indicators in FIGS. 3A-3B may be different from the thermochromic materials used for printing the indicators in FIGS. 2A-2B. Additionally, the background of the indicators in FIGS. 3A-3B may be white.

FIG. 3A illustrates a package of meat 300 including a quality indicator 301 constructed and operative in accordance with a preferred embodiment of the present invention of the type described hereinabove with reference to FIGS. 1A-1B. The indicator 301 is typically constructed to be actuatable by irradiation of the indicator with UV light.

As illustrated in FIG. 3A, indicator 301 includes a barcode which is in a first visible state 303, typically read by the barcode reader as 7431348787736, prior to actuation, as indicated by designator A. The barcode of indicator 301 preferably includes selectably appearing portions 305 and 308, preferably including thermochromic materials and preferably having at least a first visible state and a second visible state which is different from the first visible state. Preferably, the thermochromic characteristics of the thermochromic material in the selectably appearing portion 308 are different from the thermochromic characteristics of the thermochromic material in the selectably appearing portion 305 of the barcode. Preferably, the background of the indicator 301 is gray.

The selectably appearing portions 305 and 308 of the barcode including the thermochromic materials are in the first visible state prior to actuation of the indicator, and the thermochromic materials therein are preferably generally transparent. Following actuation, the selectably appearing portion 305 of the barcode including the thermochromic material assumes the second visible state preferably by immediately darkening to create barcode-reader readable contrast with the gray background, and the indicator 301 presents a barcode which is in the second visible state 304, typically readable by a barcode reader as 7811348787736 including the darkened portion 305 as long as the temperature of the package 300 has not reached a predetermined temperature, for example, 25 degrees Celsius, as indicated by designator B.

Once the temperature of the package 300 has reached 25 degrees Celsius, the selectably appearing portion 308 of the barcode including the thermochromic material assumes the second visible state preferably by darkening to create barcode-reader readable contrast with the gray background, and the indicator presents a barcode which is in the second visible state 306, typically readable by a barcode reader as 78113 62787736, including the darkened portions 305 and 308, as indicated by designator C. It is appreciated that once the state 306 is reached, the indicator preferably does not thereafter revert to the state 304 notwithstanding that the temperature of the package 300 subsequently returns to 4 degrees Celsius.

It is appreciated, although not explicitly shown, that when exposed to a temperature of less than 25 degrees Celsius the thermochromic material in the portion 308 of the barcode may assume a shade of gray which is not dark enough to create barcode-reader readable contrast with the background, and the barcode preferably remains at state 304.

FIG. 3B illustrates a package of meat 320 including a combination elapsed time in temperature indicator 321, constructed and operative in accordance with a preferred embodiment of the present invention, of the type described hereinabove with reference to FIGS. 1A-1B. The indicator 321 is typically constructed to be actuatable by irradiation of the indicator with UV light.

As illustrated in FIG. 3B, indicator 321 includes a barcode which is in a first visible state 323, typically readable by the barcode reader as 7431348787736, prior to actuation, as indicated by designator A. The barcode of indicator 321 preferably includes selectably appearing portions 325 and 328, preferably including thermochromic materials and preferably having at least a first visible state and a second visible state which is different from the first visible state. Preferably, the thermochromic characteristics of the thermochromic material in the selectably appearing portion 328 are different from the thermochromic characteristics of the thermochromic material in the selectably appearing portion 325 of the barcode. Preferably, the background of the indicator 321 is gray.

The selectably appearing portions 325 and 328 of the barcode including the thermochromic materials are in the first visible state prior to actuation of the indicator, and the thermochromic materials therein are preferably generally transparent. Following actuation, the selectably appearing portion 325 of the barcode including the thermochromic material assumes the second visible state preferably by immediately darkening to create barcode-reader readable contrast with the gray background, and the indicator 321 presents a barcode which is in the second visible state 324, typically readable by a barcode reader as 7811348787736 including the darkened portion 325 as long as the package 320 has not been exposed to a predetermined temperature and time combination, for example five hours at 15 degrees Celsius, as indicated by designator B.

Once the package 220 has been exposed to 15 degrees Celsius for five hours the selectably appearing portion 328 of the barcode including the thermochromic material assumes the second visible state preferably by darkening to create barcode-reader readable contrast with the background gray level, and the indicator presents a barcode which is in a third visible state 326, typically readable by a barcode reader as 7 811362787736, including the darkened portions 325 and 328, as indicated by designator C. It is appreciated that once the state 326 is reached, the indicator preferably does not thereafter revert to the state 324 notwithstanding that the temperature of the package 320 subsequently returns to 4 degrees Celsius.

It is appreciated, although not explicitly shown, that if the indicator 321 has been exposed to a temperature of 15 degrees Celsius for less than five hours the thermochromic material in the portion 328 of the barcode may assume a shade of gray which is not dark enough to create barcode-reader readable contrast with the background, and the barcode preferably remains at state 324.

It is also appreciated that the selectably appearing portions of the barcode including the thermochromic materials may not necessarily darken in response to actuation of the indicator or in response to a change in a time and temperature combination. The selectably appearing portions of the barcode including the thermochromic materials may assume a lighter shade or gray in response to actuation of the indicator or in response to a change in a time and temperature combination.

Reference is now made to FIGS. 4A and 4B, which are simplified illustrations of thermochromic characteristics of a plurality of different thermochromic materials particularly useful in the embodiment of FIGS. 1A-3B.

In FIGS. 4A and 4B the X-axis represents the cumulative energy absorbed by the thermochromic material as a function of time and temperature. The Y-axis represents the gray level of the thermochromic material as a function of the cumulative energy absorbed thereby.

Three curves appear in FIGS. 4A and 4B and correspond to three different thermochromic materials, here designated I, II and III. The curves designated I and II both relate to thermochromic materials which become progressively darker as a function of increased cumulative energy absorbed thereby. The curve designated III relates to a thermochromic material which becomes progressively lighter as a function of increased cumulative energy absorbed thereby.

It is appreciated that the thermochromic material represented by curve I is darker than the thermochromic material represented by curve II at all absorbed cumulative energy levels.

Turning to FIG. 4A, the following three examples are illustrative:

I. A barcode having fixed portions which are darker than a background and selectably appearing portions which are not distinguishable from the background by a conventional barcode reader, as designated by reference numeral 400 and which become progressively darker with temperature and/or time until they are distinguishable from the background by the conventional barcode reader, as designated by reference numeral 401.

Considering curve I, and an absorbed cumulative energy level indicated by reference numeral 411, it is seen that the gray level of the thermochromic material represented by curve I, designated by reference numeral 412, is not distinguishable from a background by a conventional barcode reader having a gray level contrast detection threshold indicated by reference numeral 413, until the gray level 412 of the thermochromic material lies above the gray level of the background, designated by reference numeral 414, by at least an amount equal to the gray level contrast detection threshold 413 of the barcode reader. Thus, when thermochromic materials having non-singular gray level/absorbed cumulative energy level characteristics, such as those represented by curves I, II and III are employed, appropriate selection of the gray level of the background enables a given thermochromic material to be useful for indicating a selected absorbed cumulative energy level along each curve.

II. As in Example I, a barcode having fixed portions which are darker than a background and selectably appearing portions which are not distinguishable from the background by a conventional barcode reader, as designated by reference numeral 420 and which become progressively darker with temperature and/or time until they are distinguishable from the background by the conventional barcode reader, as designated by reference numeral 421.

Considering curve II, and the absorbed cumulative energy level indicated by reference numeral 411, it is seen that the gray level of the thermochromic material represented by curve II, designated by reference numeral 422, which is lower than gray level 412, is not distinguishable from a background by a conventional barcode reader having a gray level contrast detection threshold indicated by reference numeral 423, until the gray level 422 of the thermochromic material lies above the gray level of the background, designated by reference numeral 424, by at least an amount equal to the gray level contrast detection threshold 423 of the barcode reader which is equal to gray level contrast detection threshold 413, since it is established by the barcode reader.

III. A barcode having fixed portions which are darker than a background and selectably disappearing portions which are distinguishable from the background by a conventional barcode reader, as designated by reference numeral 430 and which become progressively lighter with temperature and/or time until they are no longer distinguishable from the background by the conventional barcode reader, as designated by reference numeral 431.

Considering curve III, and an absorbed cumulative energy level indicated by reference numeral 411, it is seen that the gray level of the thermochromic material represented by curve III, designated by reference numeral 432, is distinguishable from a background by a conventional barcode reader having a gray level contrast detection threshold indicated by reference numeral 433, as long as gray level 432 lies above the gray level of the background, designated by reference numeral 434 by at least an amount equal to the gray level contrast detection threshold 433 of the barcode reader which is equal to gray level contrast detection threshold 413, since it is established by the barcode reader.

It is appreciated that a single thermochromic material may be used to indicate exceedance of multiple absorbed cumulative energy thresholds and thus the above examples may, by suitable selection of the gray level of the background, be equally applicable to absorbed cumulative energy level 437 or to any other suitable absorbed cumulative energy level lying along a curve such as curves I, II and III.

Turning to FIG. 4B, the following three examples are illustrative:

I. A barcode having fixed portions which are lighter than a background and selectably disappearing portions which are distinguishable from the background by a conventional barcode reader, as designated by reference numeral 440 and which become progressively darker with temperature and/or time until they are no longer distinguishable from the background by the conventional barcode reader, as designated by reference numeral 441.

Considering curve I, which is the same as the curve I in FIG. 4A, and an absorbed cumulative energy level indicated by reference numeral 451, which is the same as the absorbed cumulative energy level indicated by reference numeral 411 in FIG. 4A, it is seen that the gray level of the thermochromic material represented by curve I, designated by reference numeral 452, is distinguishable from a background by a conventional barcode reader having a gray level contrast detection threshold indicated by reference numeral 453, as long as gray level 452 lies below the gray level of the background, designated by reference numeral 454, by at least an amount equal to the gray level contrast detection threshold 453 of the barcode reader which is equal to gray level contrast detection threshold 413 in FIG. 4A, since it is established by the barcode reader.

II. As in Example I, a barcode having fixed portions which are lighter than a background and selectably disappearing portions which are distinguishable from the background by a conventional barcode reader, as designated by reference numeral 460 and which become progressively darker with temperature and/or time until they are no longer distinguishable from the background by the conventional barcode reader, as designated by reference numeral 461.

Considering curve II, which is the same as the curve II in FIG. 4A, and the absorbed cumulative energy level indicated by reference numeral 451, it is seen that the gray level of the thermochromic material represented by curve II, designated by reference numeral 462, which is lower than gray level 452, is detectable relative to a background by a conventional barcode reader having a gray level contrast detection threshold indicated by reference numeral 463, as long as gray level 462 lies below the gray level of the background, designated by reference numeral 464, by at least an amount equal to the gray level contrast detection threshold 463 of the barcode reader which is equal to gray level contrast detection threshold 453, since it is established by the barcode reader.

III. A bar code having fixed portions which are lighter than a background and selectably appearing portions which are not distinguishable from the background by a conventional barcode reader, as designated by reference numeral 470 and which become progressively lighter with temperature and/or time until they are distinguishable from the background by the conventional barcode reader, as designated by reference numeral 471.

Considering curve III, which is the same as the curve III in FIG. 4A, and an absorbed cumulative energy level indicated by reference numeral 451, it is seen that the gray level of the thermochromic material represented by curve III, designated by reference numeral 472, is not distinguishable from a background by a conventional barcode reader having a gray level contrast detection threshold indicated by reference numeral 473, until gray level 472 lies below the gray level of the background, designated by reference numeral 474, by at least an amount equal to the gray level contrast detection threshold 473 of the barcode reader which is equal to gray level contrast detection threshold 453, since it is established by the barcode reader.

It is appreciated that a single thermochromic material may be used to indicate exceedance of multiple absorbed cumulative energy thresholds and thus the above examples may, by suitable selection of the gray level of the background, be equally applicable to absorbed cumulative energy level 477 or to any other suitable absorbed cumulative energy level lying along a curve such as curves I, II and III.

It is appreciated, in view of the above description, that both the identity of the thermochromic ink selected for printing the plurality of bars in the selectably appearing or selectable disappearing portions of a quality indicator and the gray level of the background of the indicator together define the time and temperature thresholds for which indication of exceedance will be provided by the quality indicator. Accordingly, it is appreciated that a single thermochromic ink may be used in combination with backgrounds having different gray levels to provide indications of exceedance of different thresholds. It is further appreciated that a single background gray level may be used in combination with different thermochromic inks to provide indications of exceedance of different thresholds. It is also appreciated that various combinations of thermochromic inks and background gray levels may be used for providing an indication of exceedance of a single threshold.

It is appreciated that the shade of gray of the thermochromic materials may not necessarily change in response to a change in the energy absorbed by it, and another visually-sensible characteristic of the material, such as the color thereof, may change instead.

It is also appreciated that the energy absorbed by a material having a variable visually-sensible characteristic may change as a result of a change in other ambient parameters, for example a change in pH, impact, humidity, exposure to light, or sound waves.

Figure 5:
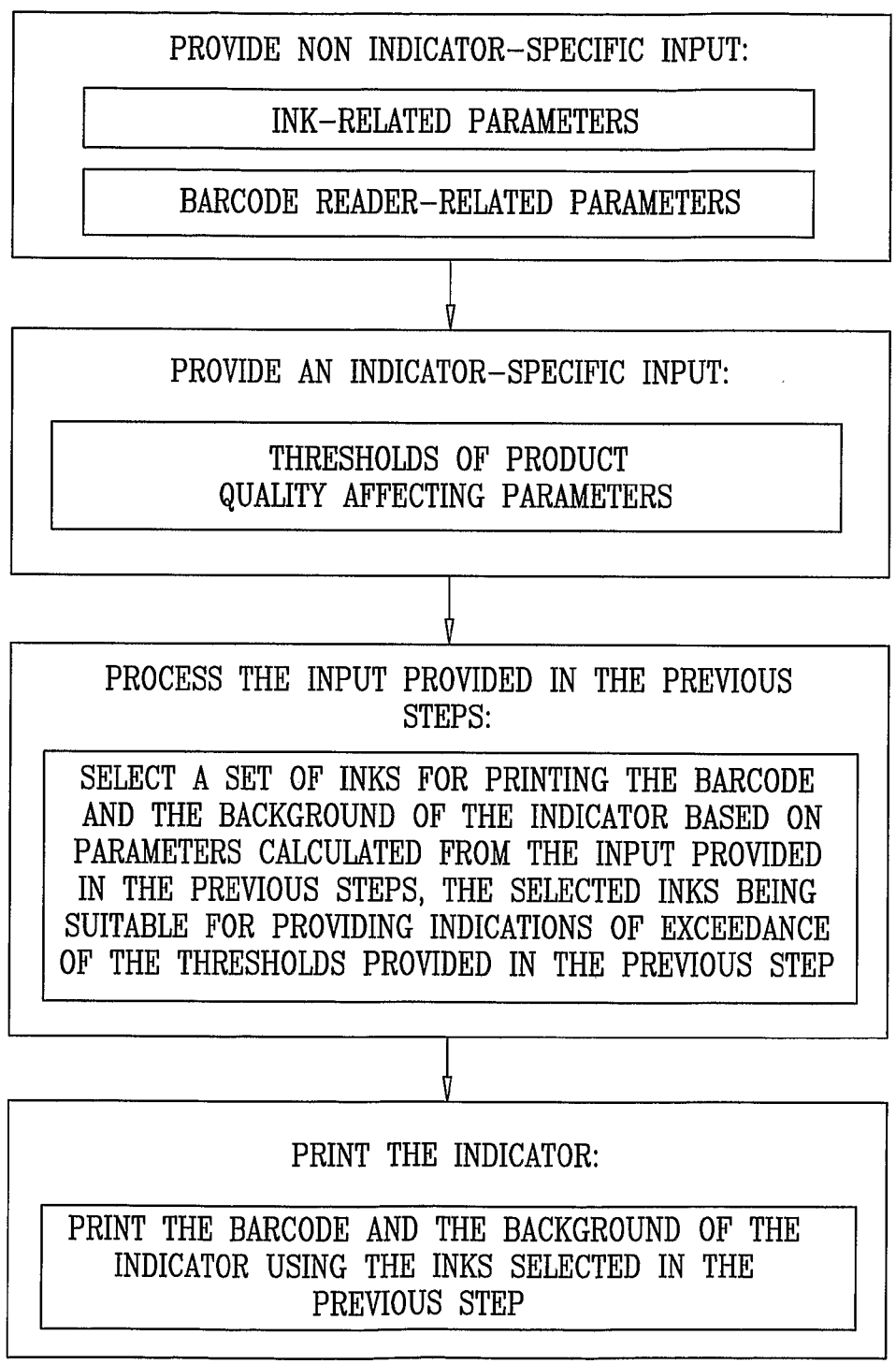
FIG. 5 is a simplified flow chart of an algorithm useful by a quality indicator producing functionality for producing quality indicators, operative to provide an indication of exceedance of thresholds by product quality affecting parameters.

Reference is now made to FIG. 5, which is a simplified flow chart of an algorithm for producing quality indicators which may be employed by a computer associated with a quality indicator producing functionality, the indicators being operative to provide indication of exceedance of thresholds by product quality affecting parameters.

As seen in FIG. 5, producing the quality indicators comprises the following steps:

Step 1 involves providing non indicator-specific input such as ink-related parameters, for example thermochromic characteristics of thermochromic inks, and barcode reader-related parameters such as contrast detection threshold of barcode readers.

More particularly, Step 1 involves providing a list of identifiers of inks having variable visually-sensible characteristics, such as a list of thermochromic ink identifiers, together with the thermochromic characteristics thereof, the characteristics may include, for example, the gray level reached by a the thermochromic ink in response to a certain time and temperature combination. In addition, Step 1 involves providing characteristics of barcode readers, for example, the contrast detection thresholds of conventional barcode readers which effectively limit their ability to distinguish between the visually-sensible characteristics of the barcode and the visually-sensible characteristic of the background.

Step 2 involves providing an indicator-specific input such as thresholds of product quality affecting parameters for which indication of exceedance is needed.

More particularly, Step 2 involves providing a set of thresholds of product quality affecting parameters for which indication of exceedance is needed, for example a set of time and temperature combinations such as thirty minutes at 40 degrees Celsius, five hours at a 15 degrees Celsius, and two weeks at a four degrees Celsius.

Step 3 involves processing the input provided in Steps 1 and 2 to select a set of inks for printing an indicator suitable for providing indications of exceedance of the thresholds provided in Step 2. These inks include inks having variable visually-sensible characteristics for printing the plurality of bars in the selectably appearing portion of the indicator, inks having a visually-sensible characteristic suitable for printing the background, and inks having a visually-sensible characteristic suitable for printing the plurality of bars in the fixed portion of the barcode.

For example, when the inks having a variable visually-sensible characteristic are thermochromic inks wherein the gray level of the ink increases in response to an increase in a time and temperature combination, Step 3 involves processing the inputs provided in Steps 1 and 2, according to the following steps:

(a) calculating for each time and temperature threshold provided in Step 2 and for each thermochromic ink provided in Step 1 the gray level assumed by the ink at the provided time and temperature threshold;

(b) calculating, based on the barcode reader contrast detection threshold, the background gray level necessary to establish a barcode-reader readable contrast with the gray level calculated in (a) of each thermochromic ink provided in Step 1 for each threshold provided in Step 2;

(c) selecting a set of thermochromic inks for printing the selectably appearing portions of the barcode and an ink having a visually-sensible characteristic which is not variable in the same way as is the barcode suitable for printing the background, such that for each threshold provided in Step 2 there is a thermochromic ink from the selected set for which a barcode-reader readable contrast is established or eliminated with the selected background upon exceedance of the threshold; and (d) selecting an ink having a visually-sensible characteristic which is not variable in the same way as is the barcode suitable for printing the fixed portion of the barcode such that barcode-reader readable contrast is present between the selected ink and the visually-sensible characteristic of the background selected in (c).

Step 4 involves printing the quality indicators using the output provided in Step 3.

It is appreciated that although the inks and materials having variable visually-sensible characteristics described in the examples hereinabove are thermochromic, the invention is not limited to thermochromic inks and materials but also could be related to inks and materials having visually-sensible characteristics which change in response to parameters such as pH, impact, humidity, exposure to light or sound waves.

It is also appreciated that while the visually-sensible characteristic of the inks and materials described in the examples hereinabove are selected from black, white, and shades of gray, the invention is not limited to these visually-sensible characteristics, and the visually-sensible characteristics of the inks and materials of the invention may also be selected from colors or other visually-sensible characteristics.

It is further appreciated that while in the embodiments of the present application indication of exceedance of a threshold is provided by the appearance of a selectably appearing portion of the barcode, it is also possible that indication of exceedance of a threshold may be provided by the disappearance of a selectably disappearing portion of the barcode.

Additionally, it is appreciated that although the background of the indicator in the examples hereinabove is generally printed with a single ink having a single shade of gray, the background of the indicator may be printed with several inks having various shades of gray such that different regions of the background have different shades of gray. Moreover, it is appreciated that different regions of the background may be printed with inks having different visually-sensible characteristics, such that, for example, different regions of the background of the indicator may have different colors. It is further appreciated that the background of the indicator may be printed with a thermochromic material.

Figure 6:
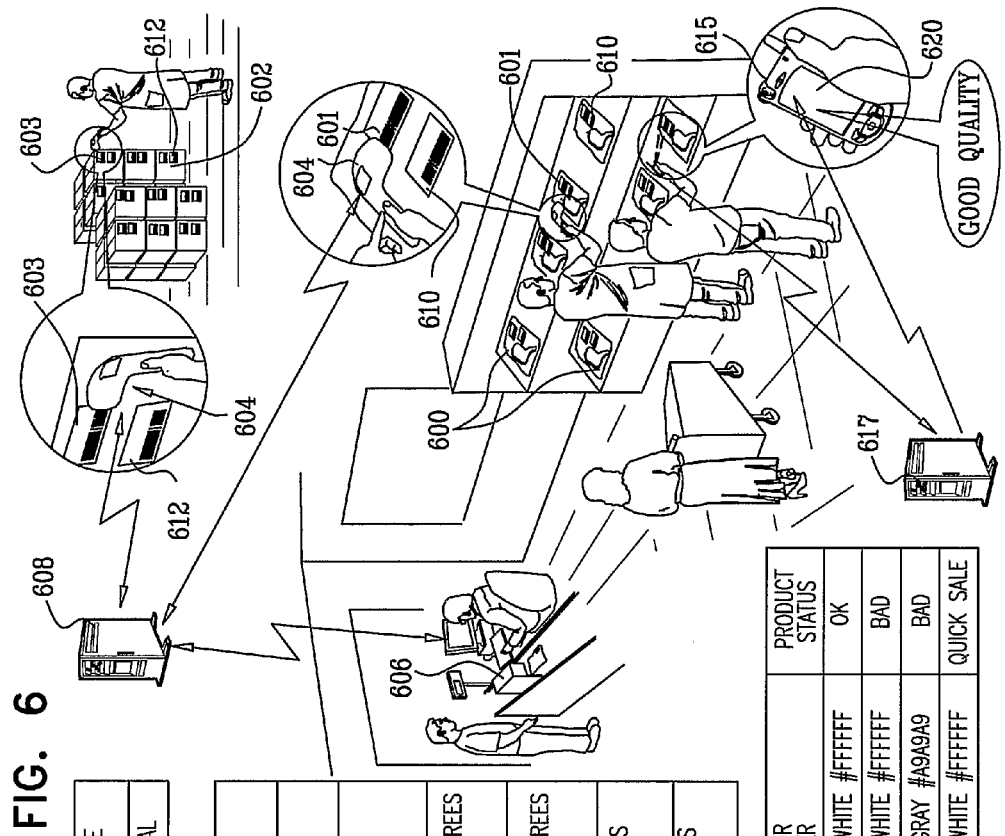
FIG. 6 is a simplified illustration of the structure and operation of a quality management system constructed and operative in accordance with a preferred embodiment of the present invention in the context of a supermarket.

Reference is now made to FIG. 6, which illustrates the structure and operation of a quality management system constructed and operative in accordance with a preferred embodiment of the present invention in the context of a supermarket. In the embodiment of FIG. 6, packaged products 600 each bear a barcoded quality indicator 601 of the general type described hereinabove and illustrated in FIGS. 1A-3B and including one or more of the operational and structural features described hereinabove. As seen in FIG. 6, cartons 602 including packages 600 bearing quality indicators 601, bear barcoded quality indicators 603 of the general type described hereinabove and illustrated in FIGS. 1A-3B and including one or more of the operational and structural features described hereinabove. Preferably, the barcoded quality indicators 603 are different from the barcoded quality indicators 601.

According to a preferred embodiment of the present invention the barcodes of the indicators 601 are printed using the same thermochromic materials as the barcodes of the indicators 603. However, the background of the indicators 601 is printed using a material with at least one visually-sensible characteristic which is different from the visually-sensible characteristic of the material used to print the background of the indicators 603.

As described hereinabove with reference to FIG. 1A, it is a particular feature of the present invention that the time and temperature combination thresholds of the quality indicators 601 and 603, placed on the individual packages and the cartons containing them respectively, are preferably related in order to provide highly effective cold chain management.

In the illustrated embodiment, the quality indicators 601 and 603 preferably include an EAN (European Article Number) barcode. When read by a conventional barcode reader 604 or by a conventional checkout scanner 606, quality indicators 601 and 603 provide barcode-reader readable indications of exceedance of one or more thresholds of product quality affecting parameters, such as a time and temperature combination to an indication interpreter which preferably forms part of or is otherwise connected to a quality indication computer 608. The quality indication computer 608 may be remote from the indicator reader.

As indicated above with reference to FIGS. 1A-2B, the quality indicator 601 preferably includes a first visible state, typically readable by a barcode reader as 7431348787736, a second visible state, typically readable by a barcode reader as 7811348787736, and a third visible state, typically readable by a barcode reader as 7811362787736.

As indicated above with reference to FIGS. 1A-1B, the quality indicator 603 preferably includes a first visible state, typically readable by a barcode reader as 7431348787750, a second visible state, typically readable by a barcode reader as 7437548787750, and a third visible state, typically readable by a barcode reader as 7437548782250.

The quality indicators 601 and 603 may differ in that they have different effective temperature and/or time thresholds and may indicate exceedance of different quality affecting parameters. It is appreciated that indication of different thresholds by quality indicators 601 and 603 may be enabled by selection of different visually sensible characteristics for the backgrounds of the indicators.

It is further seen in FIG. 6 that in addition to receiving the output indications provided by the indicator reader the quality indication computer 608 also receives product-related parameters such as product type, manufacturing date and package type, as shown in Table II. Additionally or alternatively, the quality indication computer 608 may also receive other parameters, for example information relating to the quality indicator, such as the range of parameters sensed by the quality indicator, when the quality indicator was actuated, and the visually-sensible characteristic of the background.

In the illustrated embodiment, product identification information is entered by scanning additional indicators 610 and 612, including, for example, a UPC code, which are attached to packages 600 and to cartons 602, respectively. Alternatively, the product-related parameters and the other parameters, such as those relating to the quality indicator may be provided by the quality indicators 601 and 603 themselves. As a further alternative, these parameters may be provided by sensors, a priori information otherwise available to the indication interpreter or by manual entry.

TABLE II

| PRODUCT CODE | PRODUCT DESCRIPTION | MANUFACTURING DATE | PACKAGE TYPE |
| --- | --- | --- | --- |
| 6789 | FRESH RIB STEAK | 8 MAY 2008 | INDIVIDUAL |

As seen in the illustrated embodiment, the quality indication computer 608 maintains a database which preferably includes at least an event description table, such as Table III, and a product status table, such as Table IV.

TABLE III

| EVENT BAR CODE | INDICATOR IDENTIFIER | EVENT DESCRIPTION |
| --- | --- | --- |
| 7431348787736 | 601 - WHITE #FFFFFF | INDICATOR WAS NOT ACTUATED |
| 7431348787750 | 603 - GRAY #A9A9A9 | INDICATOR WAS NOT ACTUATED |
| 7811348787736 | 601 - WHITE #FFFFFF | INDICATOR WAS NOT EXPOSED TO ≧ 12 DEGREES CELSIUS FOR ≧ THREE HOURS |
| 7437548787750 | 603 - GRAY #A9A9A9 | INDICATOR WAS NOT EXPOSED TO ≧ 12 DEGREES CELSIUS FOR ≧ FIVE HOURS |
| 7811362787736 | 601 - WHITE #FFFFFF | INDICATOR WAS EXPOSED TO ≧ 12 DEGREES CELSIUS FOR ≧ THREE HOURS |

TABLE III-continued

| EVENT BAR CODE | INDICATOR IDENTIFIER | EVENT DESCRIPTION |
|---|---|---|
| 7437548782250 | 603 - GRAY #A9A9A9 | INDICATOR WAS EXPOSED TO ≧ 12 DEGREES CELSIUS FOR ≧ FIVE HOURS |

Upon receipt of inputs identifying a product as shown in Table II and output indications provided by a quality indicator reader indicating an event described in Table III corresponding to the same product the quality indication computer 608 is operative to provide product quality status outputs. In order to provide product quality status outputs the quality indication computer 608 is operative to employ a product status table, such as Table IV, typically including product description data such as product description, package type and indicator identifier, an event barcode and a product status as follows:

TABLE IV

| PRODUCT CODE | EVENT BAR CODE | PRODUCT DESCR. | PACKAGE | INDICATOR IDENTIFIER | PRODUCT STATUS |
|---|---|---|---|---|---|
| 6789 | 7811348787736 | FRESH RIB STEAK | INDIVIDUAL | 601 - WHITE #FFFFFF | OK |
| 6789 | 7811362787736 | FRESH RIB STEAK | INDIVIDUAL | 601 - WHITE #FFFFFF | BAD |
| 5689 | 7437548782250 | FRESH RIB STEAK | CARTON | 603 - GRAY #A9A9A9 | BAD |
| 4321 | 7811362787736 | ORANGES | INDIVIDUAL | 601 - WHITE #FFFFFF | QUICK SALE |

As seen in the second and the third rows of Table IV, time and temperature thresholds of indicators 601 and 603, placed on the individual packages 600 of a fresh rib steak and the cartons 602 containing them respectively, are preferably related and calibrated with respect to each other based, inter alia, on empirical data. This feature allows for the evaluation of quality of individually packaged products even when it is not possible to open the cartons and examine individual packages, such as for example, during transport.

Additionally, as indicated above with reference to FIG. 1, the selectably appearing portions of both quality indicators 601 and 603 are preferably printed with the same thermochromic ink, and thus the selectable visually-sensible characteristics of the background of each of the indicators 602 and 603 corresponds to one of a plurality of operational ranges of product quality affecting parameters. Accordingly, a white background such as in the indicators 601 allows the indicators 601 to provide indication of exceedance of three hours at 15 degrees Celsius, and a gray background with a Hexadecimal value of #A9A9A9, such as in the indicators 603, allows the indicators 603 to provide indication of exceedance of five hours at 15 degrees Celsius.

It is appreciated that quality indicators operative to provide indication of exceedance of different thresholds of quality affecting parameters may also be printed with inks having different thermochromic characteristics.

As further seen in Table IV, there may be a great variation in the effect of a given event depending on the type of product. Thus, for example, exposure to 12 degrees Celsius for three hours may cause fresh meat to be rendered unfit for sale but may only mildly affect the quality or oranges.

In accordance with an additional feature of the present invention, the barcode may be read by a consumer employing an imager-equipped telephone or other suitable mobile communicator 615 which may be identical to mobile communicator 128 in FIG. 1C. The communicator 615 may image the quality indicators 601 or 603 and communicate the image information to a suitably programmed quality indication computer 617, which may be identical to computer 130 in FIG. 1C, and to the computer 608, and which is capable of reading the barcode from the image information. The quality indication computer 617 provides to the user, via SMS or any other suitable communication methodology, an immediate indication of a quality status, such as a GOOD QUALITY indication 620. This quality status indicates that the product is safe for use. Alternatively, if the user employs a barcode reader-equipped communicator, the communicator can provide to the quality indication computer 617 an output resulting from reading the barcode. Additionally or alternatively, the quality indication computer 617 may provide coupons to the user corresponding to the state of the quality indicator.

Based on the scanned barcode and identification of the caller, the quality indication computer 617 provides product status information both to quality assurance inspectors and to consumers. Additionally or alternatively, the quality indication computer 617 may send messages to the supermarket management regarding remedial steps to be taken, such as refrigeration maintenance instructions.

It will be appreciated by persons skilled in the art that the present invention is not limited by what has been particularly shown and described hereinabove. Rather the scope of the present invention includes both combinations and sub-combinations of various feature of the invention and modifications thereof which may occur to persons skilled in the art upon reading the foregoing description and which are not in the prior art.

The invention claimed is:

1. A barcoded quality indicator operative to provide a machine-readable indication of exceedance of at least one product quality threshold by at least one product quality affecting parameter, said barcoded quality indicator including a changeable barcode including at least one material having at least one variable visually-sensible characteristic which gradually changes as a function of changes in said at least one product quality affecting parameter and a background having at least one selectable visually-sensible characteristic which is not variable or not variable in the same way as is the barcode, said machine-readable indication of exceedance being represented by a machine-readable difference between said at least one variable visually-sensible characteristic and said at least one selectable visually-sensible characteristic, said barcoded quality indicator providing a first machine-readable indication prior to said exceedance of said at least one threshold and a second machine-readable indication, different from said first machine-readable indication, following said exceedance of said at least one threshold, said at least one product quality affecting parameter comprising an energy level representing a combination of two different product quality affecting factors.

2. A barcoded quality indicator according to claim 1 and wherein at least one of said product quality affecting parameters is selected from the group consisting of time and temperature.

3. A barcoded quality indicator according to claim 1 and wherein said barcoded quality indicator is operative to provide indications of exceedance of several different thresholds and wherein an indication of exceedance may be provided for one threshold at a time when an indication of exceedance is not provided for another threshold.

4. A barcoded quality indicator according to claim 1 and wherein said barcoded quality indicator is operative to provide said machine-readable indication only following actuation thereof.

5. A barcoded quality indicator according to claim 1 and wherein said barcoded quality indicator is machine-readable at all times, after first becoming readable, including times prior to, during and immediately following exceedance of said at least one threshold by said at least one product quality affecting parameter.

6. A barcoded quality indicator according to claim 1 and wherein said machine-readable difference between said at least one selectable visually-sensible characteristic and said at least one variable visually-sensible characteristic corresponds to a specific operational range of said at least one product quality affecting parameter.

7. A barcoded quality indicator according to claim 1 and wherein said changeable barcode includes at least a plurality of bars printed with at least one material having a variable visually-sensible characteristic which changes in response to a change in a product quality affecting parameter.

8. A barcoded quality indicator according to claim 1 and wherein said changeable barcode includes at least a plurality of bars printed with at least one material having a visually-sensible characteristic which does not change in response to a change in a product quality affecting parameter.

9. A barcoded quality indicator according to claim 1 and wherein said at least one material having at least one variable visually-sensible characteristic is a thermochromic material.

10. A quality management system for products comprising:
   a multiplicity of barcoded quality indicators operative to provide a machine-readable indication of exceedance of at least one product quality threshold by at least one product quality affecting parameter, said barcoded quality indicators including a changeable barcode including at least one material having at least one variable visually-sensible characteristic which gradually changes as a function of changes in said at least one product quality affecting parameter and a background having at least one selectable visually-sensible characteristic which is not variable or not variable in the same way as is the barcode, said machine-readable indication of exceedance being represented by a machine-readable difference between said at least one selectable visually-sensible characteristic and said at least one variable visually-sensible characteristic, said barcoded quality indicators providing a first machine-readable indication prior to said exceedance of said at least one threshold and a second machine-readable indication, different from said first machine-readable indication, following said exceedance of said at least one threshold, said at least one product quality affecting parameter comprising an energy level representing a combination of two different product quality affecting factors;
   a barcode indicator reader operative to read said barcoded quality indicators and to provide output indications based on a difference between said at least one selectable visually-sensible characteristic of said background and said at least one variable visually-sensible characteristic of said barcode; and
   an indication interpreter operative to receive said output indications and to provide human sensible product quality status outputs.

11. A quality management system according to claim 10 and wherein said indication interpreter is further operative to receive an input in addition to said output indications, said input being necessary to provide product quality status outputs.

12. A quality management system according claim 11 and wherein said indication interpreter forms part of or is otherwise connected to a computer comprising a product status table useful to provide product quality status outputs based on said output indications and said input.

* * * * *

UNITED STATES PATENT AND TRADEMARK OFFICE
CERTIFICATE OF CORRECTION

PATENT NO.        : 8,540,156 B2                                     Page 1 of 1
APPLICATION NO. : 12/742650
DATED             : September 24, 2013
INVENTOR(S)       : Nemet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 614 days.

Signed and Sealed this
Fifteenth Day of September, 2015

Michelle K. Lee
*Director of the United States Patent and Trademark Office*